Nov. 9, 1926. 1,606,126
R. L. HOUSTON
AUTOMATIC TYPEWRITER
Filed April 8, 1922 18 Sheets-Sheet 2
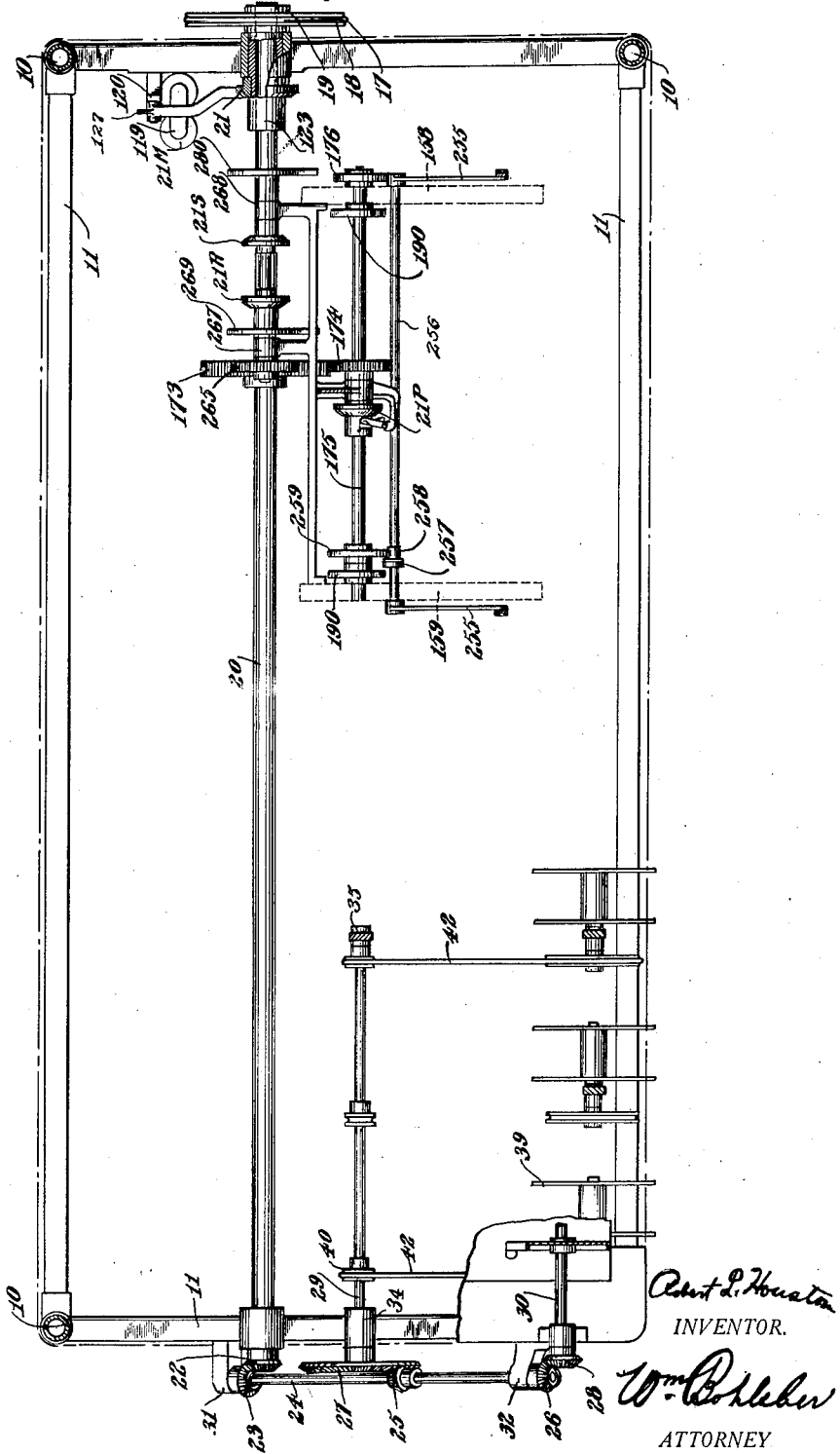

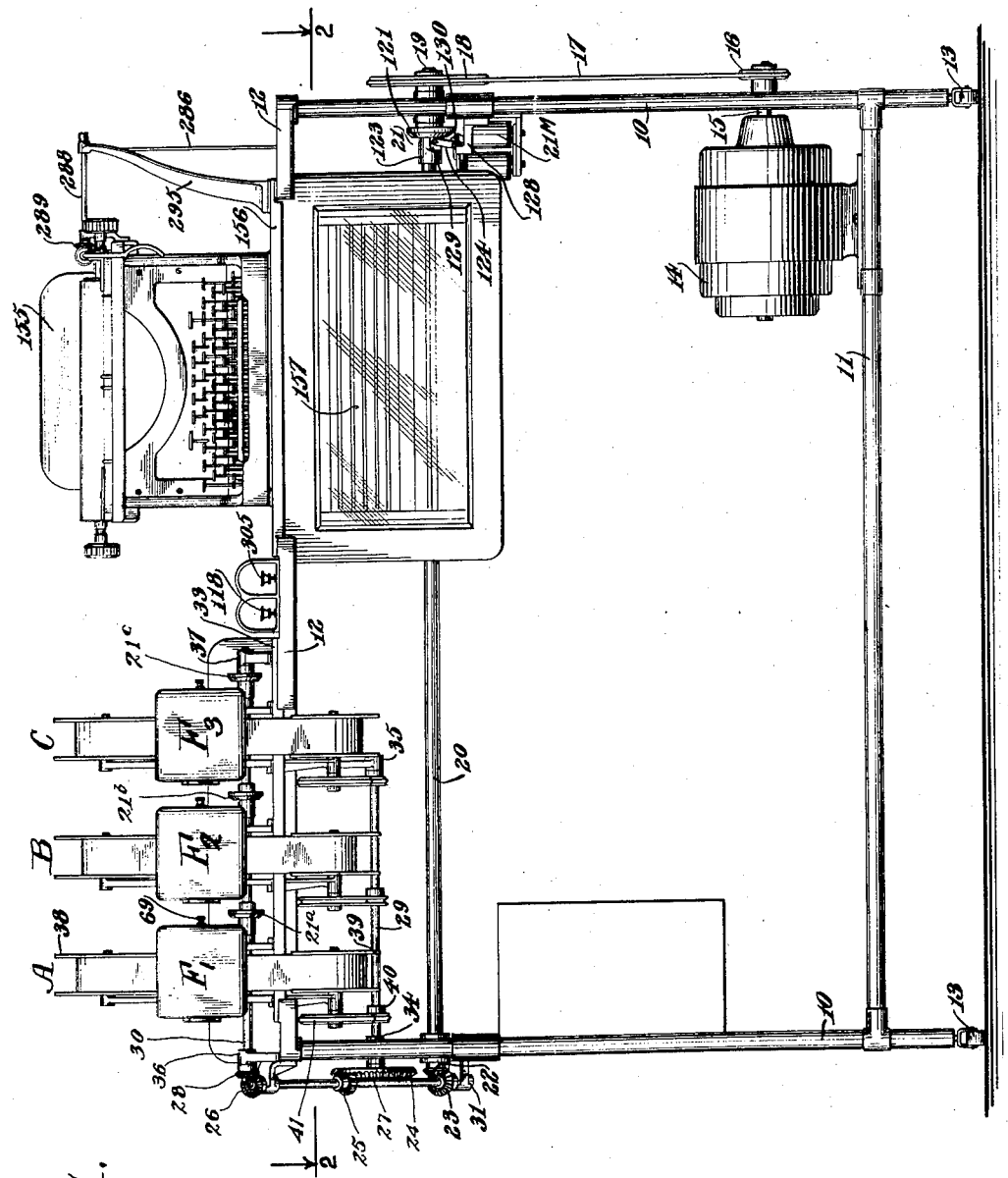

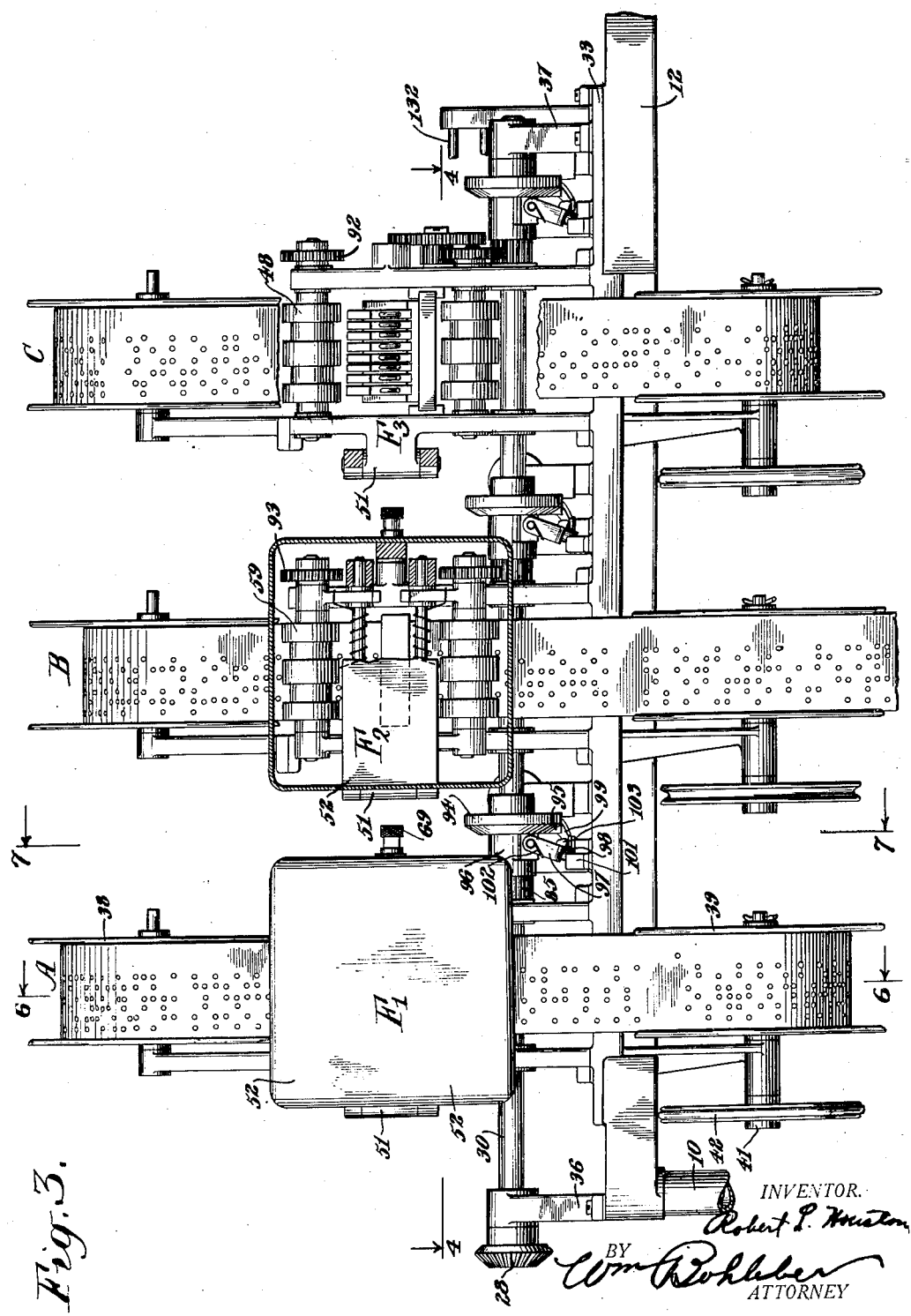

Nov. 9, 1926.
R. L. HOUSTON
1,606,126
AUTOMATIC TYPEWRITER
Filed April 8, 1922     18 Sheets-Sheet 4
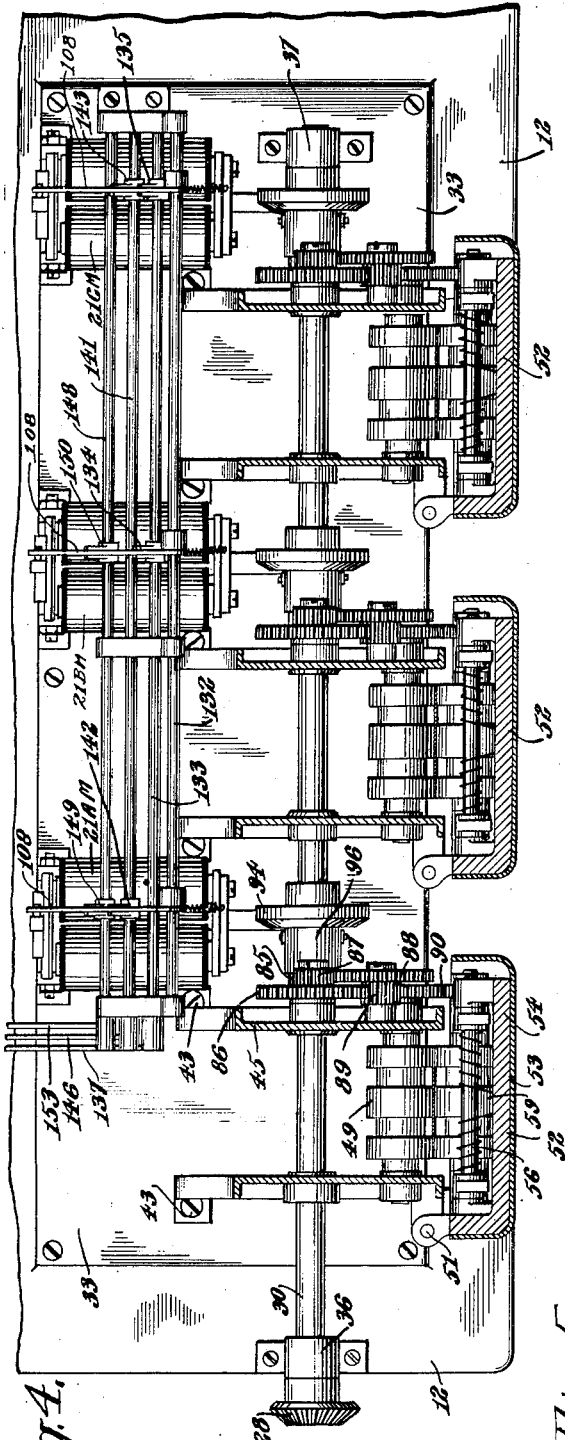
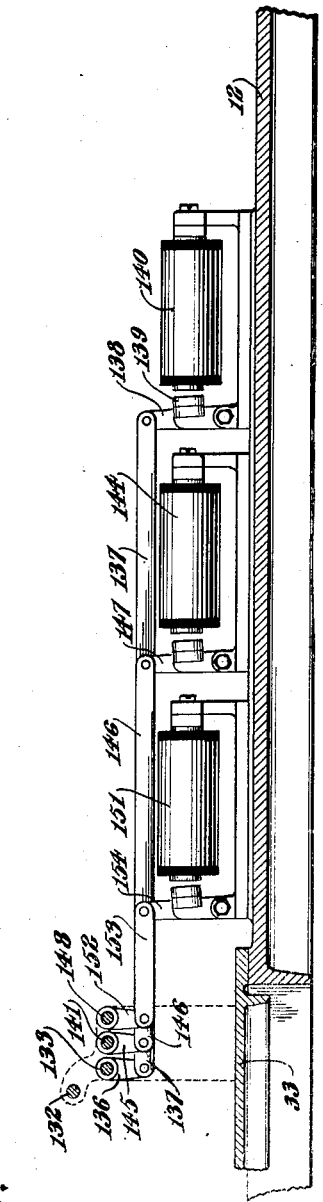
INVENTOR.
Robert L. Houston
BY Wm Rohleber
ATTORNEY

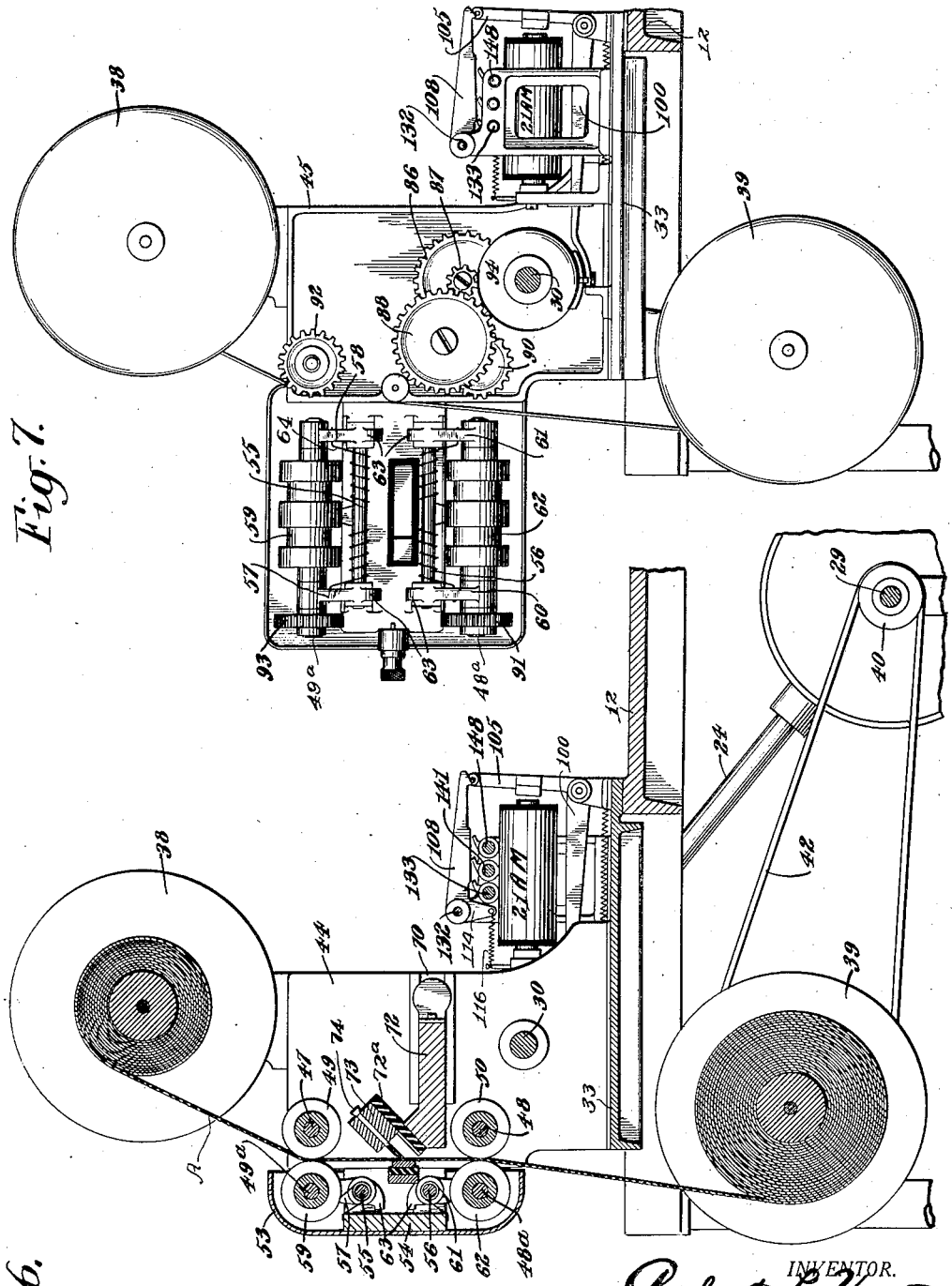

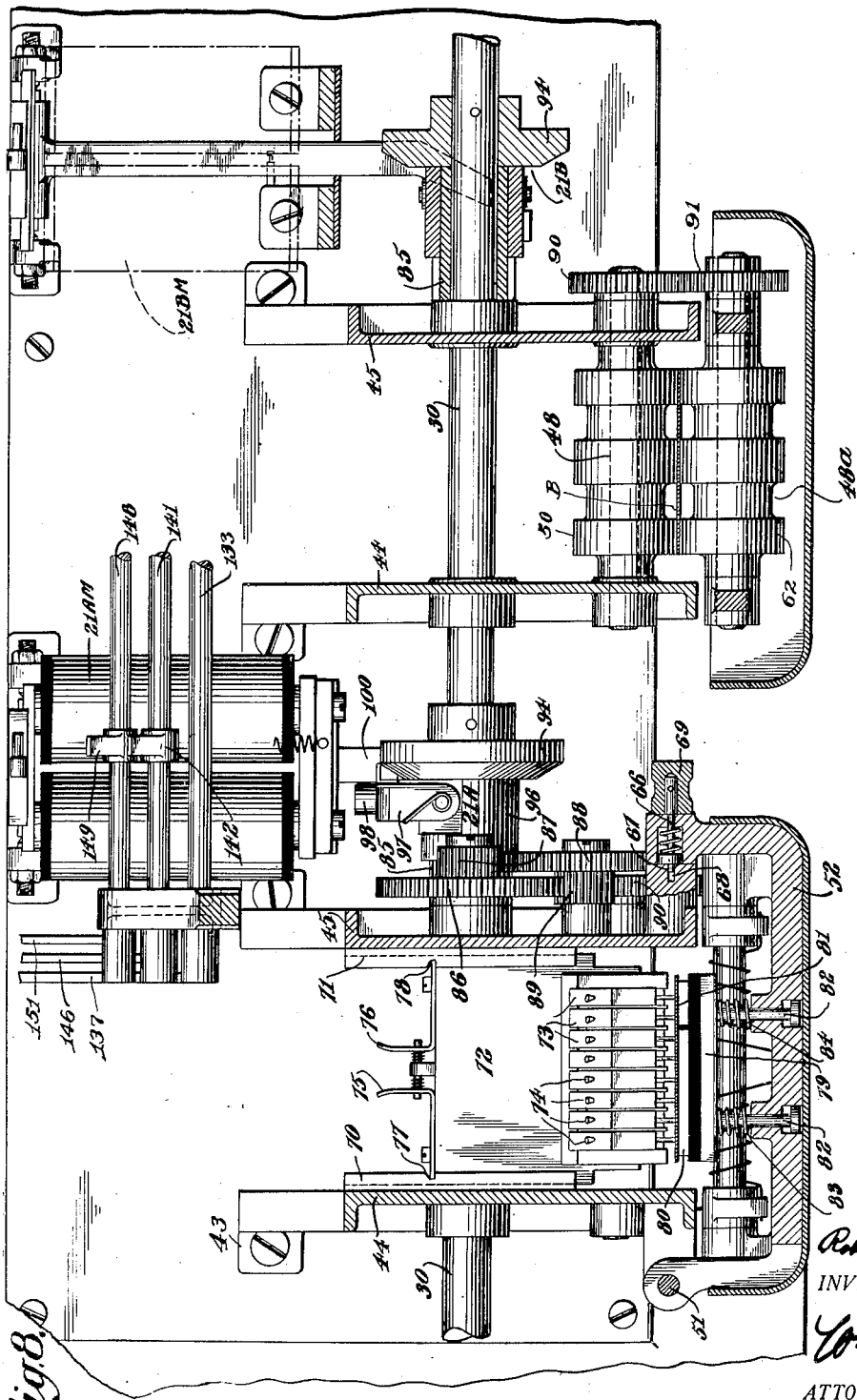

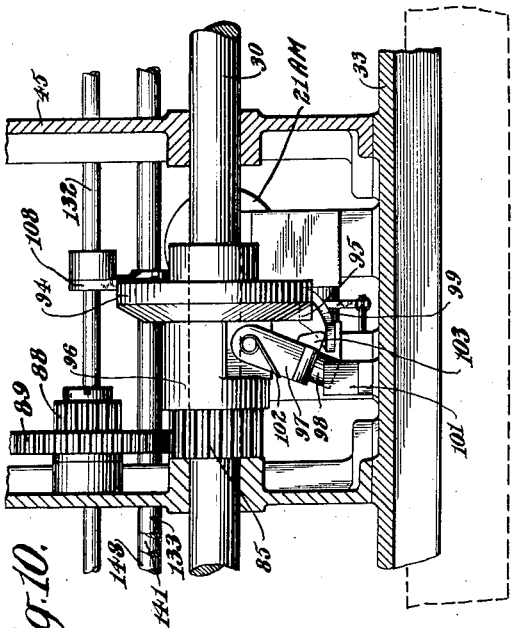

Nov. 9, 1926.

1,606,126

R. L. HOUSTON

AUTOMATIC TYPEWRITER

Filed April 8, 1922  18 Sheets-Sheet 8

INVENTOR.
Robert L. Houston
BY Wm Bohleber
ATTORNEY

Nov. 9, 1926.
R. L. HOUSTON
AUTOMATIC TYPEWRITER
Filed April 8, 1922
1,606,126
18 Sheets-Sheet 10

Nov. 9, 1926.

R. L. HOUSTON

AUTOMATIC TYPEWRITER

Filed April 8, 1922    18 Sheets-Sheet 11

1,606,126

INVENTOR.
Robert L. Houston
BY
Wm Bohleber
ATTORNEY

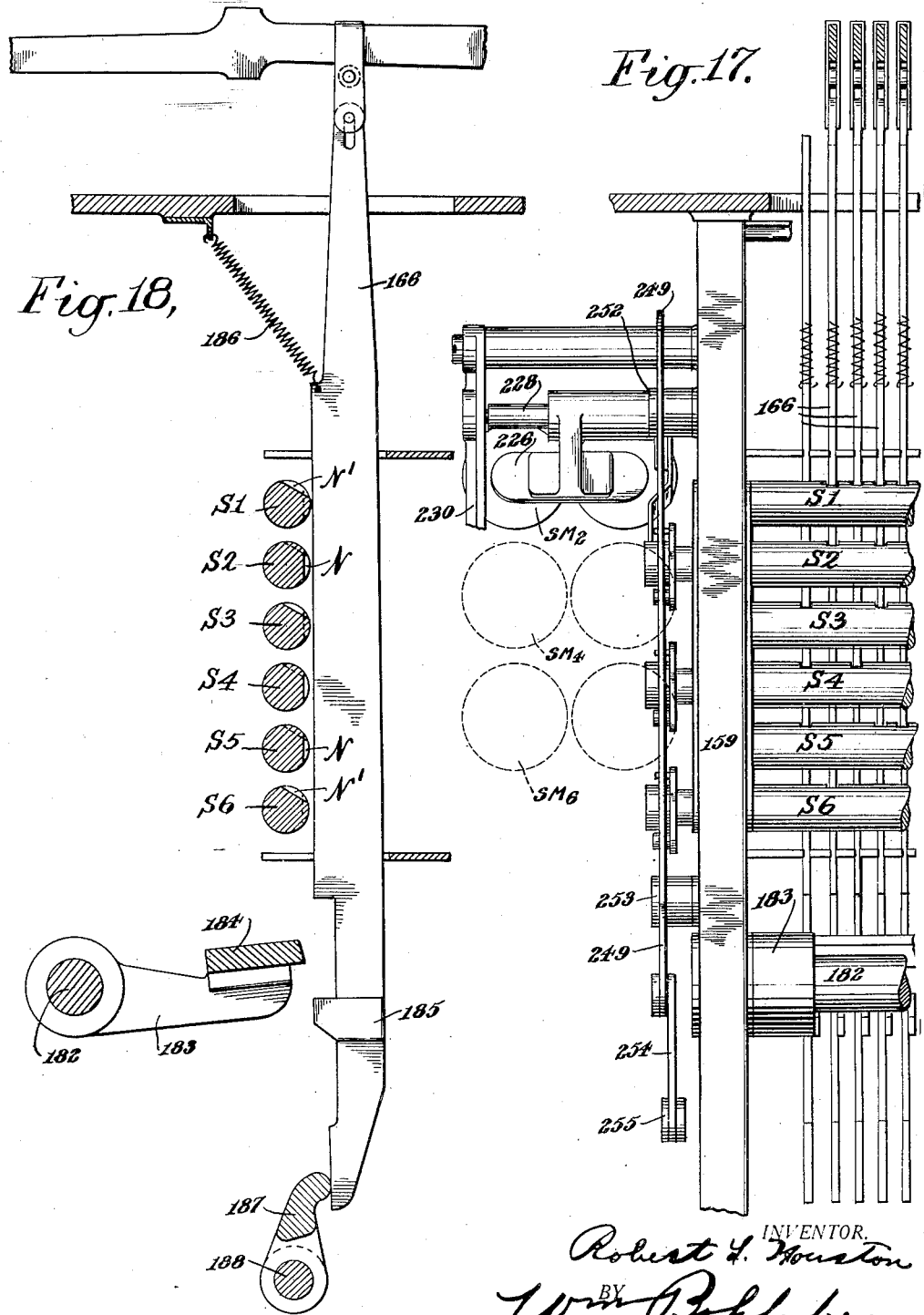

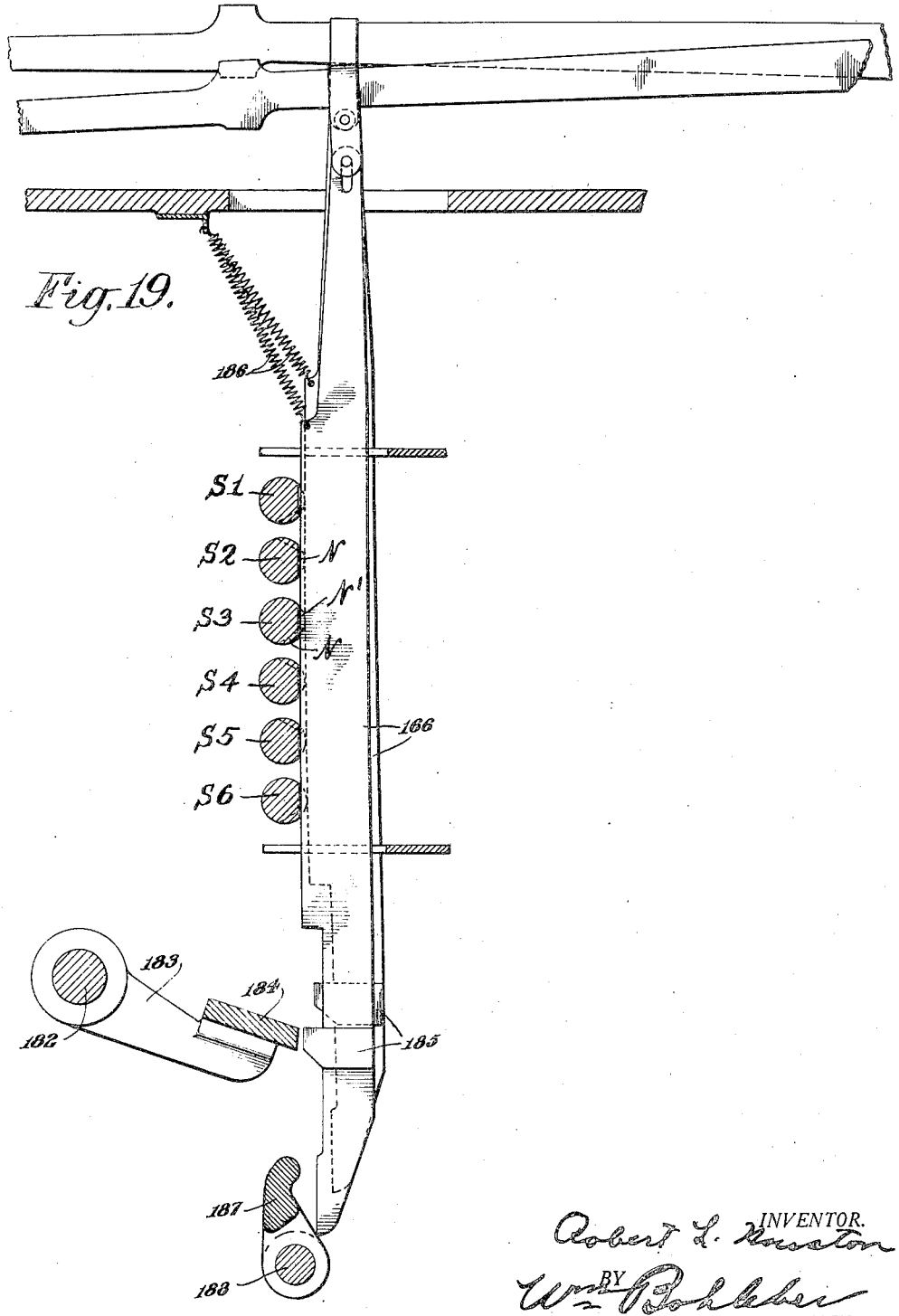

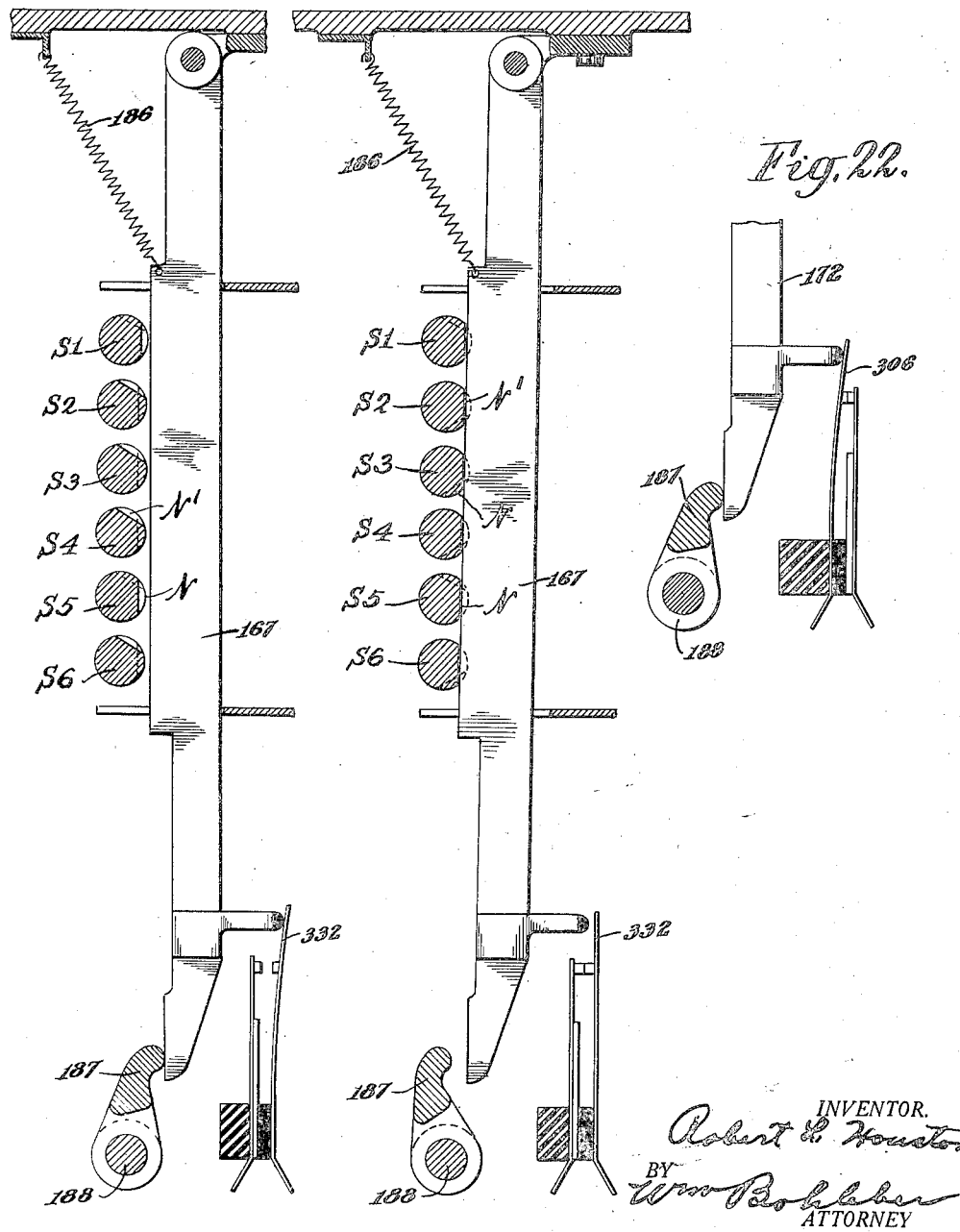

Fig. 23.
Fig. 24.
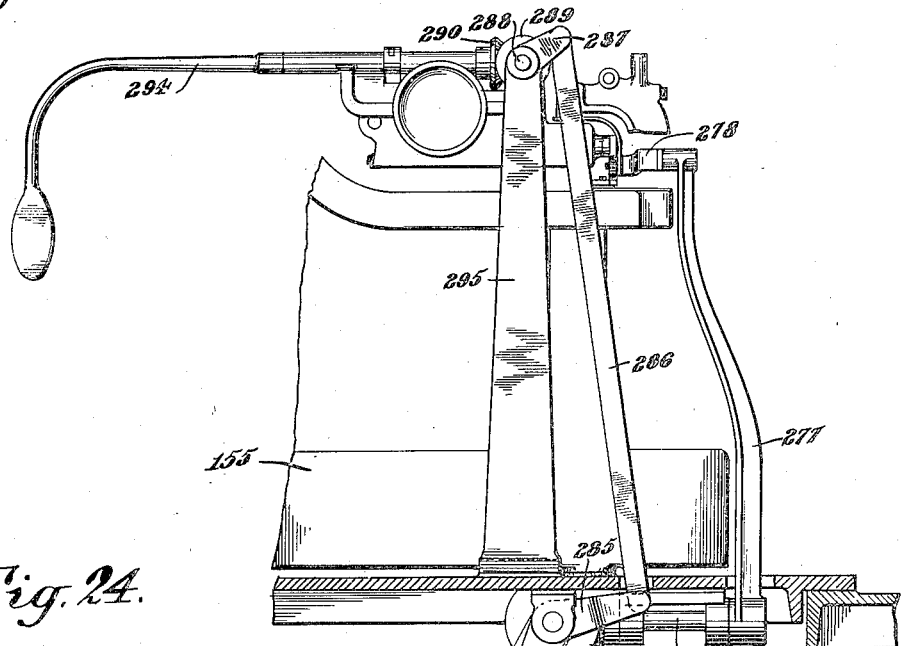
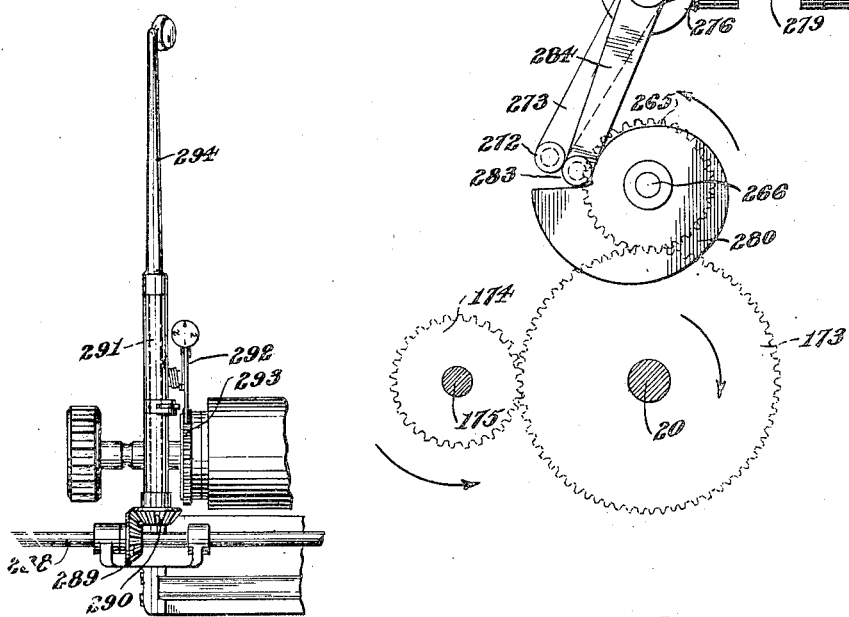

Nov. 9, 1926.

R. L. HOUSTON

AUTOMATIC TYPEWRITER

Filed April 8, 1922

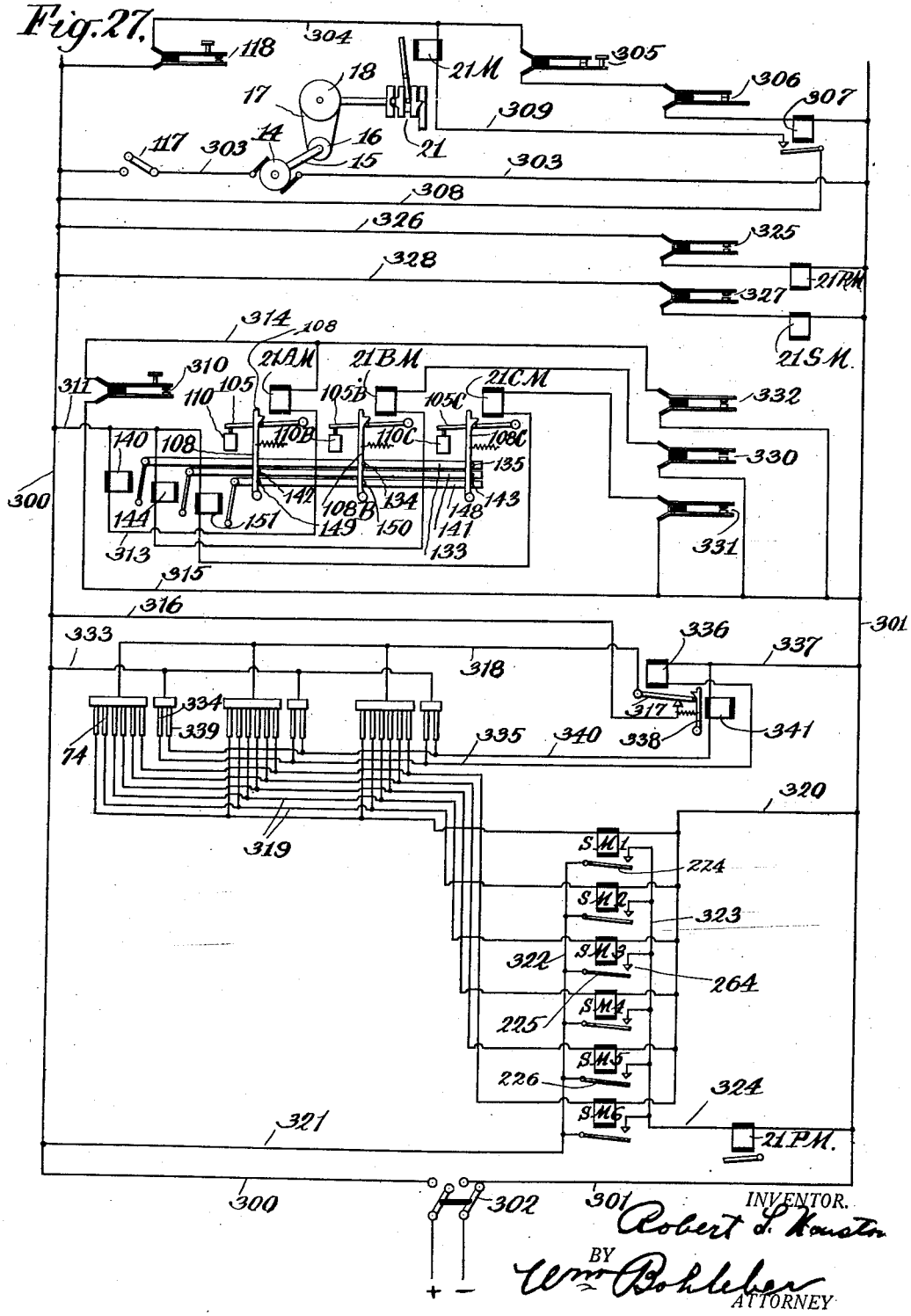

Patented Nov. 9, 1926.

1,606,126

UNITED STATES PATENT OFFICE.

ROBERT L. HOUSTON, OF NEW YORK, N. Y.

AUTOMATIC TYPEWRITER.

Application filed April 8, 1922. Serial No. 550,657.

The invention which constitutes the subject matter of this application pertains to automatic typewriters which will automatically write any desired letter or document which has been previously perforated in code on a strip or tape of paper or other suitable material. More specifically the invention has to do with a device for automatically transcribing material corresponding to code perforations and in which a portion of the material may be omitted or other material selected at will, as a result of which, among other things, the date, address, salutation, personal matter, etc., are automatically typed with the material which forms the body of the letter to be sent out in quantities.

Referring to the drawings which illustrate the preferred embodiment of my invention:

Figure 1 is a front elevation of the entire machine illustrating the preferred embodiment of my invention;

Figure 2 is a horizontal section taken on the line 2—2 of Figure 1;

Figure 3 is a front elevation of the various code tape feeding means with portions broken away and other parts removed to more clearly illustrate the details thereof;

Figure 4 is a horizontal section taken on the line 4—4 of Figure 3;

Figure 5 is a detail view showing the control magnets for automatically rendering the tape feeding clutches inoperative to actuate the feed mechanism for the tapes;

Figure 6 is a cross sectional elevation on the line 6—6 of Figure 3 illustrating the feed mechanism for one of the tapes and the relation of the latter to said feed mechanism;

Figure 7 is a section on the line 7—7 of Figure 3;

Figure 8 is a horizontal section taken on the line 8—8 of Figure 3, illustrating two of the code tape feeding devices;

Figure 9 is an enlarged sectional view showing one of the magnetically operated means for controlling one of the feeding mechanism clutches;

Figure 10 is an enlarged detail of one of the tape feeding clutches;

Figure 11 is a detail of the main clutch of the machine and the magnetically operated means for controlling the same to couple up the motor with the main shaft of the machine;

Figure 17 is an enlarged detail front elevation on the left hand side of the translating mechanism illustrating the other three code magnets employed for selecting the particular character to be printed or other act or acts to be performed by the machine;

Figure 18 illustrates an enlarged view of one of the translating plates suspended from the type bar which is actuated to print a particular type, the means for actuating said plate and the means for normally holding the various plates out of contact with the selecting bars being shown in cross section;

Figure 19 is an illustration similar to Figure 18 showing, however, two of the translating plates, one of which is in operative position to enable the operation of one of the types on the type bar. This figure also illustrates the printing bar common to all of the translating plates for operating the latter when in their operative position;

Figure 20 illustrates the call bar or plate for the clutch 21A;

Figure 21 is the same parts as shown in Figure 20 in operative position;

Figure 22 is a detail showing a portion of the call bar and the contact for the six hole stop;

Figure 23 is an enlarged detail elevation showing the mechanism employed for spacing the paper and returning the carriage;

Figure 24 is a detail plan view of the paper spacing mechanism;

Figure 12:
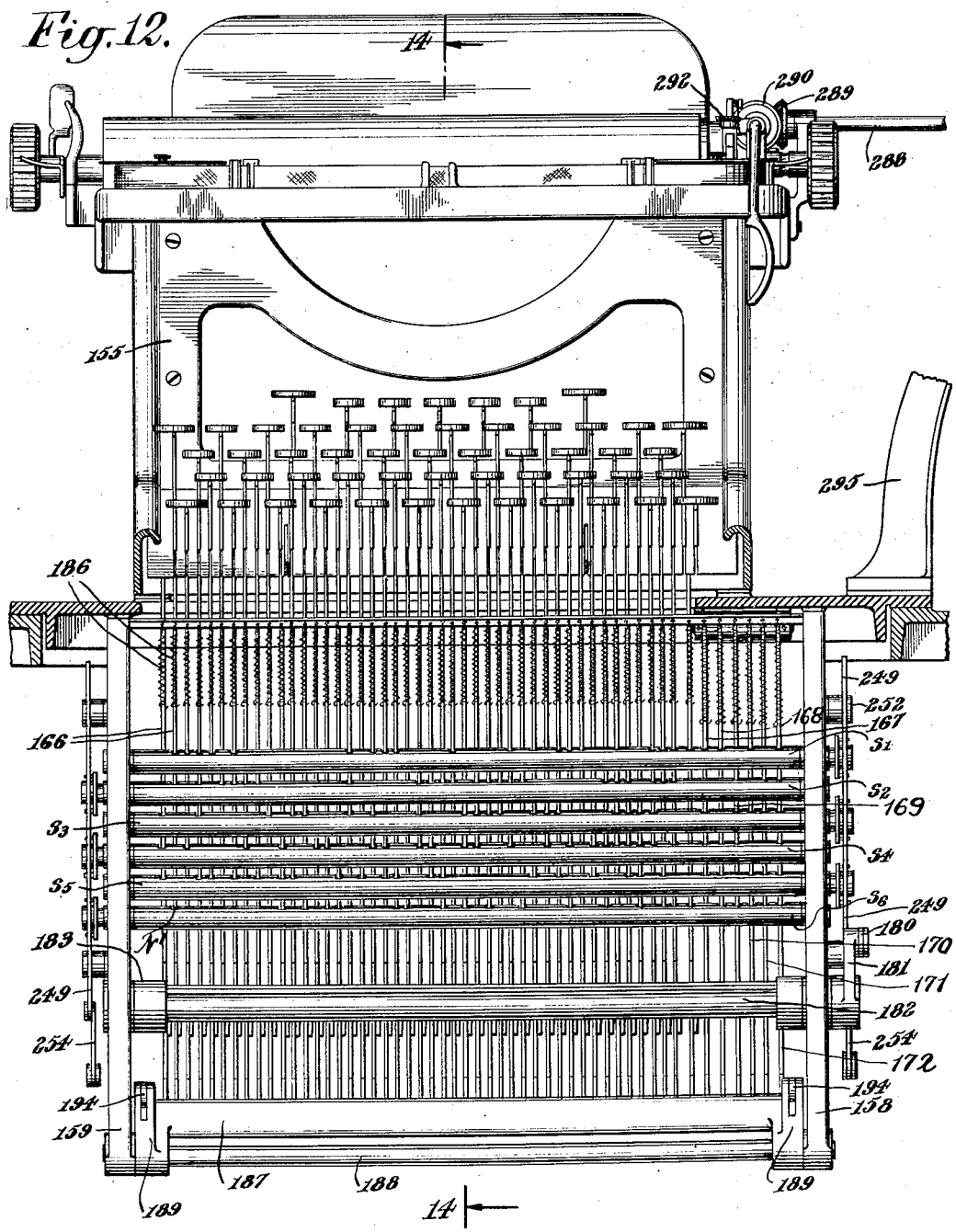
Figure 12 is a front elevation illustrating the translating mechanism, that is the mechanism for translating the code of the code tape or tapes into typewriting.

Figure 26 illustrates the three code tapes A, B and C employed with my invention, each horizontal row of perforations of any particular tape being a code corresponding to some particular character to be printed or some act to be performed automatically by the machine. At the left hand margins of these tapes there is indicia to indicate the meaning of such horizontal rows. These indicia do not appear upon the tape when employed for commercial purposes;

Figure 27 is a diagram of the electrical circuits employed in the operation of the machine. Various parts of the machine are also diagrammatically illustrated so that electric wiring of the machine will be more readily understood;

The machine is suitably supported upon any form of framework, but for illustrative purposes I prefer to employ the rectangular form illustrated in Figures 1 and 2 which comprises a plurality of standards 10, provided with connecting braces 11 adjacent the lower ends thereof and a top member 12, the latter being constructed to serve as a direct support for the translating mechanism and tape feeding devices which are operatively related and connected to each other and which will hereinafter be described in detail. Although the machine may be made stationary or portable it is preferably supported upon casters 13 to facilitate its movement from place to place.

In the embodiment of my invention illustrated and described herein there is employed a number of clutches and for convenience I have used throughout an old and well known form of the one-revolution type. The main clutch I have designated by the character 21, the tape feeding clutches by 21A, 21B and 21C, the print clutch by 21P, the carriage return clutch by 21R and the spacing clutch by 21S. The magnets for controlling these various clutches I have designated by the characters 21M, 21AM, 21BM, 21CM, 21PM and 21SM respectively. The selecting bars I have designated by the characters $S_1$, $S_2$, $S_3$, $S_4$, $S_5$ and $S_6$, and the code magnets for releasing the selecting bars I have designated by $SM_1$, $SM_2$, $SM_3$, $SM_4$, $SM_5$ and $SM_6$.

The typewriter and tape feeding devices may be actuated by any suitable means, but for ease of illustration and description and by preference of constructions they are shown herein as driven by a common electric motor 14, preferably supported upon the braces 11, as clearly illustrated in Figure 1. This motor is provided with a shaft 15 upon which is fixed a pulley 16. A belt 17 passes over pulley 16 and also over a pulley 18 fixed upon sleeve 19. The machine is provided with a main driven shaft 20, a magnetically operated clutch member 21 mounted upon sleeve 19 being employed to couple up said sleeve and the main drive shaft to drive the various units of the machine, that is the translating mechanism and the tape feeding instrumentalities, the latter of which I will now proceed to describe in detail.

Secured to the end of the main drive shaft 20 opposite the end on which the automatic clutch member 21 is mounted, is a bevel gear 22 meshing with a bevel gear 23 fixed to the shaft 24 to drive the latter. To this shaft 24 is also secured two other bevel gears 25 and 26 which mesh with bevel gears 27 and 28 respectively, the latter in turn being respectively fixed to one of the ends of the shafts 29 and 30. As clearly illustrated in Figures 1 and 2, the shaft 24 is located in a vertical plane and is suitably mounted to rotate in bearings 31 and 32 secured to the framework of the machine. The tape feeding devices generally designated by the characters $F_1$, $F_2$ and $F_3$ are provided with a base plate 33 (see Figs. 1 and 3) suitably supported upon the top member 12 of the framework. Depending from this base plate are two arms 34 and 35 (see Fig. 1) provided with bearings for rotatably supporting the shaft 29, and projecting upwardly from the base plate 33 are two arms 36 and 37 (see Figs. 1 and 3) provided with bearings for rotatably supporting the shaft 30. The tape feeding devices comprises three independently actuated tape feeding mechanisms $F_1$, $F_2$ and $F_3$ for feeding the code tapes A, B and C, all of which are actuated from the common shaft 30. It may be here stated that in the present embodiment of my invention the code tape A is perforated to correspond with a series of addresses, the code tape B with a stock paragraph that forms the body of the letter and code tape C is perforated to carry a series of personal remarks which can be cut in with the particular addresses to which they correspond. The three tape feeding mechanisms are identically the same; hence it is only necessary to describe one of the same in detail and for that purpose I will refer to the mechanism $F_1$, employed for feeding code tape A.

The tape A is fed by the tape feeding mechanism from the roll 38 and is rewound upon the roll 39, the latter being actuated from the shaft 29 through pulleys 40 and 41 and belt 42, the construction being such that there is always a certain amount of tension on the tape. When the tension exceeds a certain degree a slippage occurs between the belt 42 and one or both of its pulleys. Suitably secured to the base plate 33, as by screws 43 (see Fig. 4) are side frames 44 and 45, through which the shaft 30 passes. Journaled in these side frames are shafts 47 and 48 (see Fig. 6), to the former of which is fixed a feed device 49 and to the latter of which is fixed a feed device 50. Pivoted at 51 to an arm on the plate 44 is a gate 52 comprising a cover plate 53 and a member 54 suitably secured thereto. The member 54 is equipped with two pintles 55 and 56. Pivotally supported upon pintle 55 by means of the arms 57 and 58 (see Fig. 7) is a feed device 59 and pivotally supported upon pintle 56 by means of the arms 60 and 61 is a feed device 62. At least one of the arms 57 and 58 and at least one of the arms 60 and 61 is provided with a toe or extension 63 adapted to abut against the member 54 to limit the movement of said feed device in one direction when biased in that direction by means of the springs 64 and 65, (see Fig. 7) the latter being primarily employed to cause the feed devices 49 and 59 and the feed devices 50 and 62 to grip the tape A. It is only when the gate is opened that the toes 63 come into play as will be understood. The gate is provided with a spring pressed plunger 66 (see Fig. 8) the extension 67 of which normally engages within the hole 68 to maintain said gate in normal operative position. To swing the gate about its pivot 51 it is only necessary to withdraw the extension 67 from the hole 68 by means of the operating knob 69, as will be clearly apparent from an inspection of Figure 8.

The side frames 44 and 45 are provided respectively with suitable guides 70 and 71 (see Figs. 6 and 8) for the member 72 which carries the brush blocks 73 separated or insulated from one another and also insulated from said member 72, as clearly illustrated in Fig. 6. Supported by these blocks 73 are the code brushes 74, there being in this case eight in number, corresponding to the eight longitudinal rows of code perforations in the code tape. The member 72 is provided with manually operable spring pressed members 75 and 76, (see Fig. 8) the ends of which, when the code brushes are in normal operative position, engage in the notches 77 and 78 respectively for maintaining said code brushes in normal engagement with the tape. The carrier 52 is further provided with a bar 79 (see Fig. 8) having common return plates 80 and 81 insulated therefrom and separated or insulated from each other, said plates being arranged in juxtaposition to said brushes 74 (see Fig. 6) and adapted to make contact therewith through the code perforations in the tape to close a circuit thereby operating the translating and cut out devices, as will more fully hereinafter appear. The bar 79 is supported from the carrier by two pintles 82, the springs 83 and 84 surrounding said pintles being employed to maintain the plates 80 and 81 in normal engagement with the tape A and in proper relationship to the brushes 74.

As before suggested, motion is imparted to the feed rollers 49, 50, 59 and 62 from the shaft 30. This may be accomplished by any suitable mechanism, but I prefer to effect the same through a train of gears which I will now describe in detail. Upon the shaft 30 is a suitably actuated pinion 85 meshing with and adapted to drive the gear 86. Fixed to gear 86, in axial alignment therewith, is a pinion 87 which meshes with gear 88 to which is also fixed in axial alignment therewith a pinion 89. The latter meshes with and drives gear 90 which is fixed to the feed roller shaft 48. Upon the feed roller shaft 48$^a$ is a companion gear 91 having the same number of teeth as gear 90, in consequence of which the train of gears just described imparts the same angular speed to feed roller 62 as that imparted by said train to the feed roller 50. Upon the shafts 47 of feed roller 49 is also fixed a gear 92 (see Fig. 7) which in the normal position of the parts meshes with a companion gear 93 on the shaft 49$^a$ of the feed roller 59. It will be noted, however, that the gears 92 and 93 are idle and are employed merely to effect a uniform peripheral speed of the feed rollers 49 and 59. It will be further noted that gears 91 and 93 are unmeshed from gears 90 and 92 when the carrier is swung from normal position about its hinge 51. The gear train is such that one revolution of the shaft 30 imparts one unit of advance to the code tape.

As before stated, the specific mechanism $F_2$ and $F_3$ illustrated for feeding the tapes B and C is similar to that for feeding tape A; that is to say, the mechanism for feeding tapes B and C comprises elements corresponding to the parts 38 to 93 inclusive above described. The tape feeding mechanisms are each put in and out of operation by magnetically controlled clutches 21A, 21B and 21C. These clutches and the mechanism for controlling their operation are, however, so inter-related that only one clutch can operate at a time, although the mechanism is so constructed and arranged that each clutch has a delayed release so as to feed the tape for an instant after the particular feed mechanism has been declutched. The construction of the clutch 21A and the mechanism for actuating it to operate the feed mechanism to propel the code tape A will now be described.

Upon the shaft 30 is fixed a cone-shaped member 94 (see Fig. 10) provided with a notch or shoulder 95 on the conical portion thereof. Loosely mounted upon said shaft 30 is a member 96 which is either integral with or carries the pinion 85 and which is provided with a pivoted dog 97 having a portion 98 thereof normally held by the extension 99 of the arm 100 in the path of the stop 101 projecting upwardly from the base plate 33. The dog 97 is equipped with a spring 102 which tends to move it to the right to enable the nose 103 thereof to engage the notch or shoulder 95, and will so engage when the extension 99 of the arm 100 is moved downwardly to release the same. The means for so moving the arm 100 comprises a magnet 21AM (see Fig. 9) which, when energized, attracts the armature 104, thereby moving the arm 105 in a counterclockwise direction about its pivotal point 106 against the tension of the spring 107. Located above the magnet 21AM is a pivoted spring pressed latch member 108 adapted to engage over the stud 109 located on the arm 105 when the armature is attracted and thus hold the extension 99 of arm 100 out of the path of the pivoted dog 97, thereby enabling the nose 103 to be engaged by the shoulder 95 upon the next revolution of the cone-shaped member 94. Suspended from the base plate 33 is a dash pot 110 equipped with a piston 111. This piston is provided with a stem 112 connected to the arm 100 and is also equipped with one or more ports 113 so controlled as to enable a free movement of the arm 100 downwardly to throw the clutch into operation, but effects a retarded movement of the clutch upon the release of the armature carrying arm 105 from the latch member 108. It may be stated at this point that the magnet 21AM is only momentarily energized, the parts being held thereafter by the latch member 108. And it may also be stated that the retardation of the declutching operation is to enable a slight movement of the code tape beyond those holes thereof which are selected among other things to release the latch 108. The latch member is provided with an arm 114 normally abutting against a stop 115 under the tension of the spring 116 for maintaining the same normally in operative relationship with the stud 109. When the arm 100 moves upwardly the curved and laterally deflected end 99 thereof moves into the path of the stud 98, thereby causing the dog 97 to be cammed to the left, thus disengaging the nose 103 from the shoulder 95, and moving the stud 98 so as to be arrested by the projection 101 to stop the rotation of the dog and consequently the pinion member 96 to which the dog is pivoted. As before suggested the pinion 85 constitutes a part of the member 96 and it will thus be clearly apparent that the stopping and starting of the rotation of member 96 effects the stopping and starting of the feed mechanism for the code tape.

The operation of those parts of the machine so far described may be summarized as follows: The first step is to close the motor switch illustrated by the numeral 117 on Figure 27. The magnetic clutch 21 on the sleeve 19 is normally declutched, therefore the closing of the motor switch merely actuates the said sleeve 19 through the pulley 16, belt 17 and pulley 18. To couple up the motor 14 with the main drive shaft 20 to actuate the feed shaft 30 the start key 118 illustrated on Figs. 1 and 27 is depressed. This energizes the magnet coil 21M (see Figures 1 and 11) which attracts the armature 119 pivoted about the point 120 with a result that the arm 127 with its extension 126 is depressed against the tension of the spring 131. The type of clutch here employed is precisely the same as those used to couple up shaft 30 with the code tape feeding mechanisms. Therefore, to avoid prolixity of description it is only necessary to state that the parts designated by numerals 121 to 130 correspond to the parts described above and designated respectively by numerals 94 to 103 inclusive. The arrangement, however, is such that so long as the machine is running normally the magnet 21M is energized; therefore no mechanism other than the magnet is required to maintain the clutch 21 in clutched position.

It is obvious from the foregoing statement and description that in the embodiment of the invention illustrated only one code tape feeding mechanism is operated at a time. That is to say, if it is desired to feed code tape A provisions must be made for declutching the mechanism $F_2$ for feeding tape B or the mechanism $F_3$ for feeding the tape C if either of these happens to be in operation. Similarly, if it is desired to feed code tape B provisions must be made for declutching the mechanism $F_1$, for feeding tape A or the mechanism $F_3$ for feeding tape C if either of them happens to be in operation. And again if it is desired to feed code tape C, provision must be made for declutching the mechanism $F_1$, for feeding code tape A or the mechanism $F_2$ for feeding code tape B if either of these happens to be operating. To accomplish this I employ the following mechanism.

The latch member 108 is preferably pivotally supported upon rod 132 (see Figs. 4, 6 and 9) which is transversely located not only across magnet 21AM, but also across the corresponding magnets employed in conjunction with the clutch mechanism for tapes B and C. (See Fig. 4.) Located transversely of the aforesaid magnets and in fixed relation thereto and also located under the latch members 108 is a release bar 133 provided with trip members 134 and 135. This bar 133 is provided with a downwardly projecting arm 136, (see Fig. 5), the lower end of which is pivoted to one end of the link 137, the other end of said link being pivoted to the pivoted arm 138, the latter being provided with an armature 139, which, when the magnet coil 140 is energized as it will be in manually or automatically selecting or cutting in tape A, will move said arm 138 about its pivot towards the magnet, thereby rotating the release bar 133 through link 137 and arm 136, thus causing the trip members 134 and 135 to release the other two latches corresponding to latch 108 should either be in normal operative position to feed tape B or C. The magnet 140 is in series with magnet 21AM. Similarly the release bar 141 is provided with trip members 142 and 143 for releasing the latches of the magnets 21AM and 21CM employed in conjunction with the mechanisms for feeding tapes A and C. This trip bar is actuated by the magnet 144 which is in series with the magnet 21BM employed in conjunction with the mechanism for feeding tape B, the magnet 144 being operatively connected to the release bar through the arm 145, link 146 and the pivoted armature lever 147, these parts corresponding to the parts above described and designated by the numerals 136, 137 and 138 respectively. And similarly the release bar 148 is provided with trip members 149 and 150 for releasing the latches of the magnets 21AM and 21BM employed in conjunction with the mechanisms for feeding tapes A and B. This trip bar is actuated by the magnet 151 which is in series with the magnet 21CM employed in conjunction with the mechanisms for feeding tape C, the magnet 151 being operatively connected to the release bar through the arm 152, link 153 and the pivoted armature lever 154, these parts also corresponding to the parts above described and designated by the numerals 136, 137 and 138 respectively.

The translating mechanism comprises a typewriter and such mechanism connected to and associated with the same as will actuate the typewriter in accordance with the characters and other operations to be performed corresponding to the perforations in the code tapes. Any typewriter may be employed, but for illustrative purposes I have shown an L. C. Smith & Bros. machine. However, I will describe those parts only of the typewriter per se as are necessary to a complete understanding of the construction and operation of my invention. The parts of the typewriter not described herein may be assumed to be old and well known.

The reference numeral 155 designates a typewriter of some standard form suitably supported upon and secured to the base 156. Also secured to this base but suspended therefrom is the mechanism controlled by the code tapes for actuating the typewriter; this mechanism being located in a suitable framework or housing (see Figure 1) provided with a closure 157 on the front thereof, the same being preferably open at the rear thereof. This framework comprises, among other things, side frames 158 and 159. Journaled in the side frames 158 and 159 is a plurality of notched, magnetically controlled selecting bars $S_1$, $S_2$, $S_3$, $S_4$, $S_5$ and $S_6$ which cooperate with a bank of character translating plates 166. It may be stated at this point that the code perforations of each tape control the position of the translating bars and when the latter are so positioned that one of the vertical series of corresponding notches are brought into alignment, as indicated in Figure 19, the character translating plate corresponding thereto will be forced into said notches thus positioning that particular plate to enable it to be actuated. To the right of the character translating plates 166 are other plates, six being illustrated, for performing other operations more fully described below. These additional plates are designated by the numerals 167, 168, 169, 170, 171 and 172.

Each selecting bar is provided with two longitudinal series of notches N and N', one of the series being normally in operation and the other in inoperative relationship to the selecting plates. The notches in one series are staggered with respect to the notches of the other series of the same bar; that is to say, no notch of one series is located in the same plane with a notch of the other series of the same bar. There are six of these notched selecting bars. The number of translating plates ordinarily employed is approximately forty-six. And by simple mathematical computation it can be shown that the number of translating plates that can be provided for on any given number of bars is in accordance with the equation $X=2n+1$ where "$x$" denotes the number of different vertically aligned series of notches that can be effected and "$n$" the number of bars. If therefore six bars are provided 63 combinations of vertically aligned series of notches can be effected.

The operation of the translating mechanism is effected by means of a gear 173 which meshes with and constantly rotates a pinion 174 loosely mounted upon shaft 175 the latter being provided with a one-revolution clutch 21P. (See Fig. 2.) Through the medium of this clutch a one revolution movement is imparted to the shaft 175 and thereby causes the actuating cams 176, 190, 190 and 259 (see Fig. 2) of the machine to pass through one cycle, thereby causing said cams to effect the printing of the desired character and the return of the parts to normal position. The cam 176 is employed to engage and actuate the translating plates attached to the type bars to effect the printing; the cams 190, 190 are employed to hold the selecting plates normally out of contact with the selecting bars; and the cam 259 is employed to return the bars to normal position. The mechanism controlled by these cams will be now described in detail.

The surface of the cam 176 (see Figs. 2 and 13) is in engagement with a stud 177 located upon the lever 178 so that the rotation of said cam causes an oscillation of the lever 178 about its pivotal point 179 as a center. To the upper end of the lever 178 is connected one end of the link 180 the other end of said link being pivoted to the arm 181 fixed to one end of the rocker shaft 182. Upon the shaft 182 is one or more arms 183 which carry a printing bar 184 common to all of the selecting plates 166 and adapted to actuate the latter by its engagement with the shoulders 185 which can only take place however when the particular translating plate is in the position indicated in full lines in Figure 19, as the shoulder 185 thereof is normally out of the path of movement of said bar 184. The rotation of the cam 176 will cause a positive movement of the arm 178 in a clockwise direction as viewed on Figure 13, thereby imparting a similar movement to the arm 181, rocker shaft 182, arms 183 and bar 184, the latter, as before stated, being adapted to actuate the translating plates 166. A spring 185 is employed to cause the stud 177 to ride down the receding face of the cam and thereby return the parts to normal position. When the translating plates 166 are moved downwardly to actuate the type levers they are automatically returned to normal position by means of springs 186.

Figure 14:
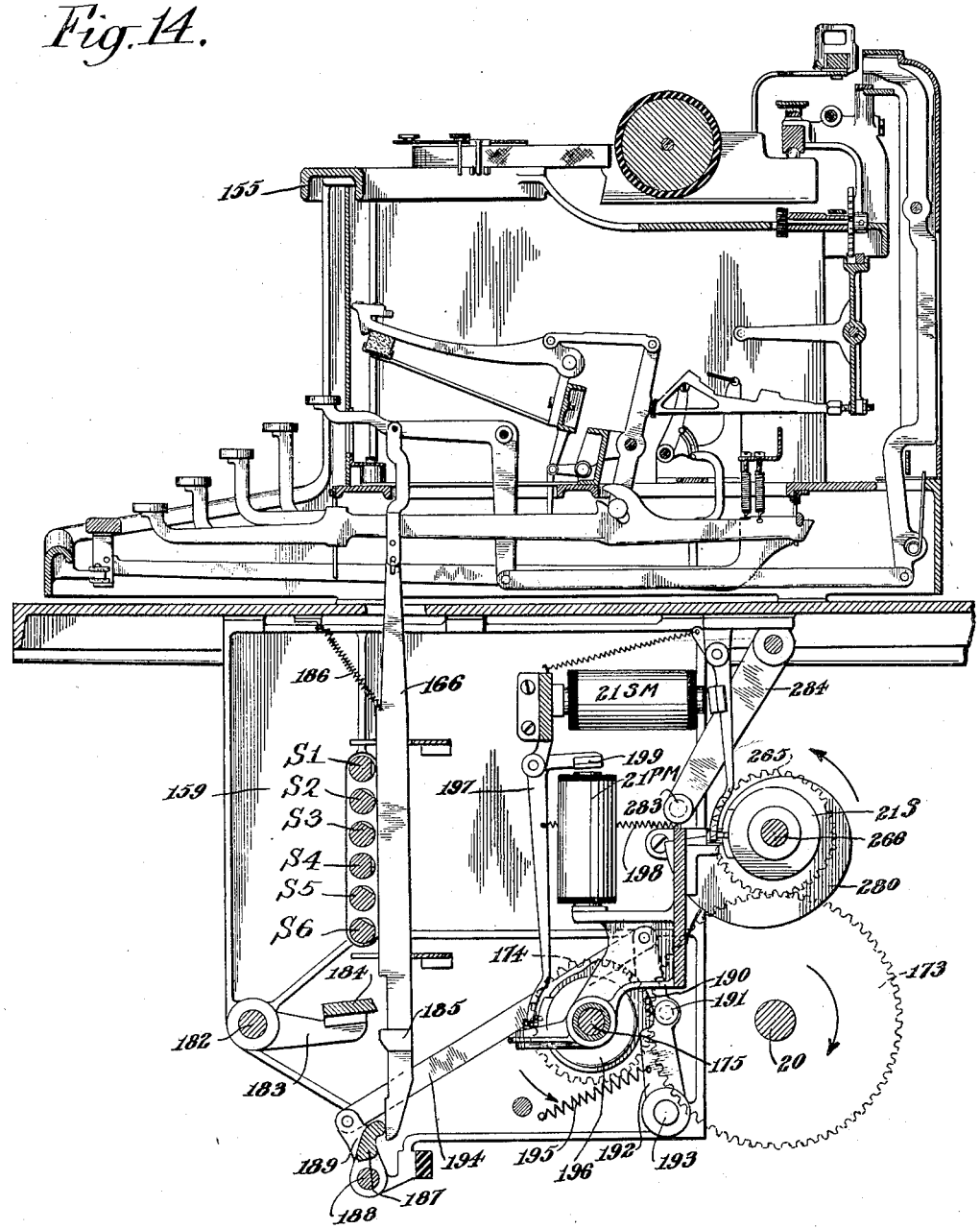
Figure 14 is a central section of the translating mechanism substantially on the line 14—14 of Figure 12.

There is a large number of translating plates employed. If these all rested against the selecting bars S to S₆ they would cause considerable friction and render it difficult to rotate the same. Therefore mechanism actuated by cams 190, 190, is employed for holding the translating plates out of contact with the selecting bars although releasing the same whenever the bars have been properly positioned for operation. This mechanism comprises a toe or bar 187 (see Figs. 12 and 14), common to all of the translating levers, pivotally mounted upon the pintle 188 and provided with an arm 189 at each end thereof. The pintle 188 extends between and is supported by the lower portions of the side frames 158 and 159 as clearly illustrated in Figure 12. The means for actuating the toe or bar comprises similar mechanism connected to the arms 189, one of which is located inside the side frame 159 and the other located inside the side frame 158. Only the actuating mechanism located adjacent the side frame 159 is fully illustrated (see Fig. 14). This comprises the cam 190 (see Figs. 2 and 14) fixed upon the shaft 175 adjacent the left hand end thereof. The surface of this cam is in engagement with a stud 191 (see Figure 14) located upon the lever 192 pivoted at 193 to frame 159. The other end of this lever 192 is pivotally connected to one end of the link 194, the other end of said link being pivotally connected to the arm 189 (see also Figure 12), the latter, as before stated, being provided upon the toe 187 common to and normally contacting with all the translating plates to hold the latter out of contact with said bars. A spring 195 is employed to maintain the stud 191 in constant contact with the surface of said cam 190 thereby causing the said stud to ride upon the receding as well as the ascending portions of said cam, and thereby enabling the translating plates to move towards the selecting bars in the printing operation. As before stated, there are a large number of these translating plates; hence the desirability in view of their inertia of providing means connecting both ends of said bar or toe 187 for moving and normally holding said plates out of engagement with the bars. Only the corresponding parts 189, 190 and 194 of the toe actuating mechanism adjacent the side frame 158 are illustrated. The cams 190 will be rotated to actuate the arms 189 and thereby the plates 166 when the one revolution clutch 21P is thrown into operation to actuate the countershaft 175. This one revolution clutch herein referred to as the print clutch, is controlled by the arm 197, magnet 21PM and armature 199, precisely the same as the clutch 21A for actuating the feed mechanism for the tape is controlled by arm 100, magnet 21AM and armature 105. Hence no further description of clutch 21P is necessary except to say that a spring 198 is employed to hold the clutch normally in declutched position.

Figure 13:
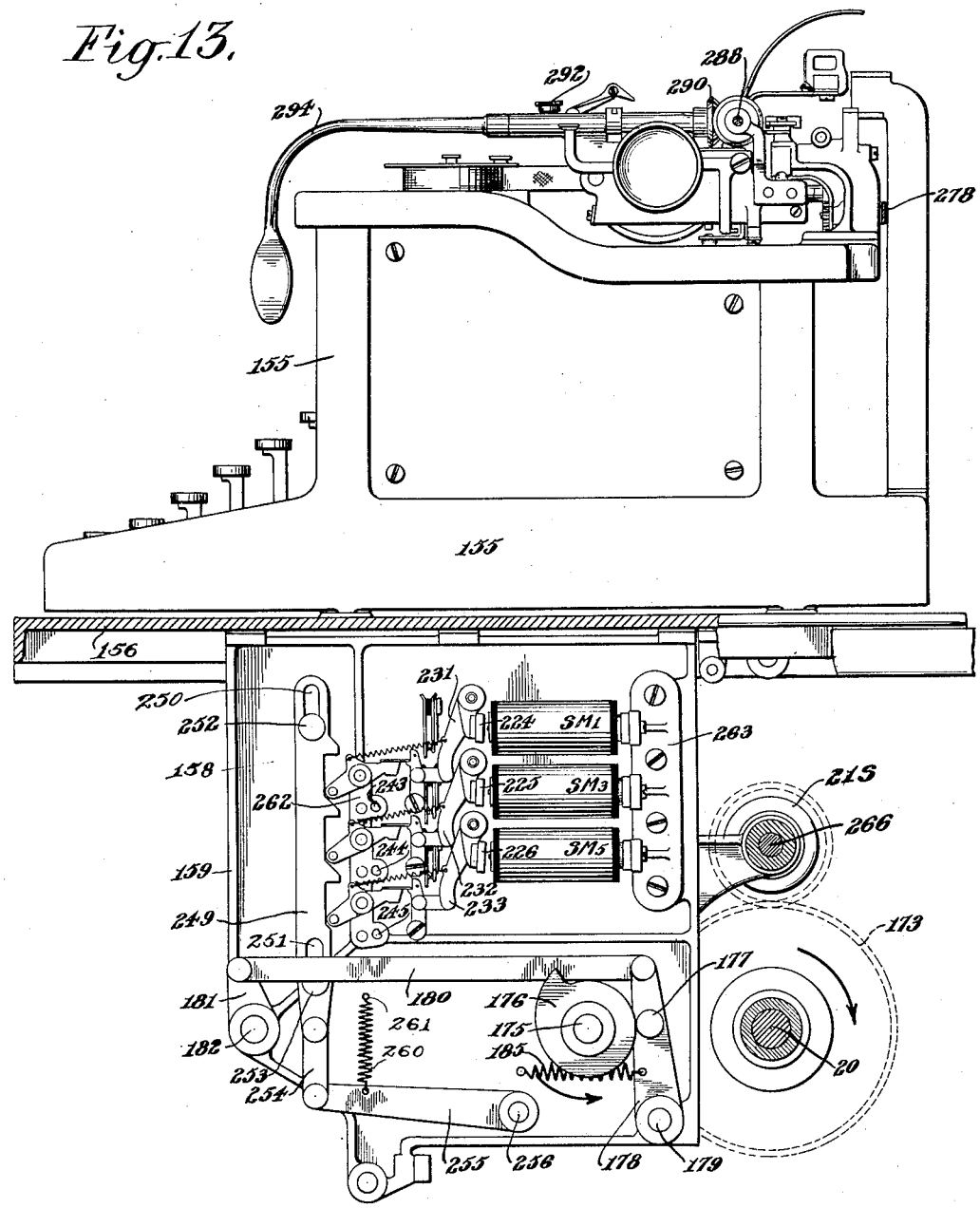
Figure 13 is a side elevation of the typewriter and the translating mechanism, illustrating three of the code magnets and mechanism associated therewith employed as means for selecting the particular character to be printed or typed.
Figure 15:
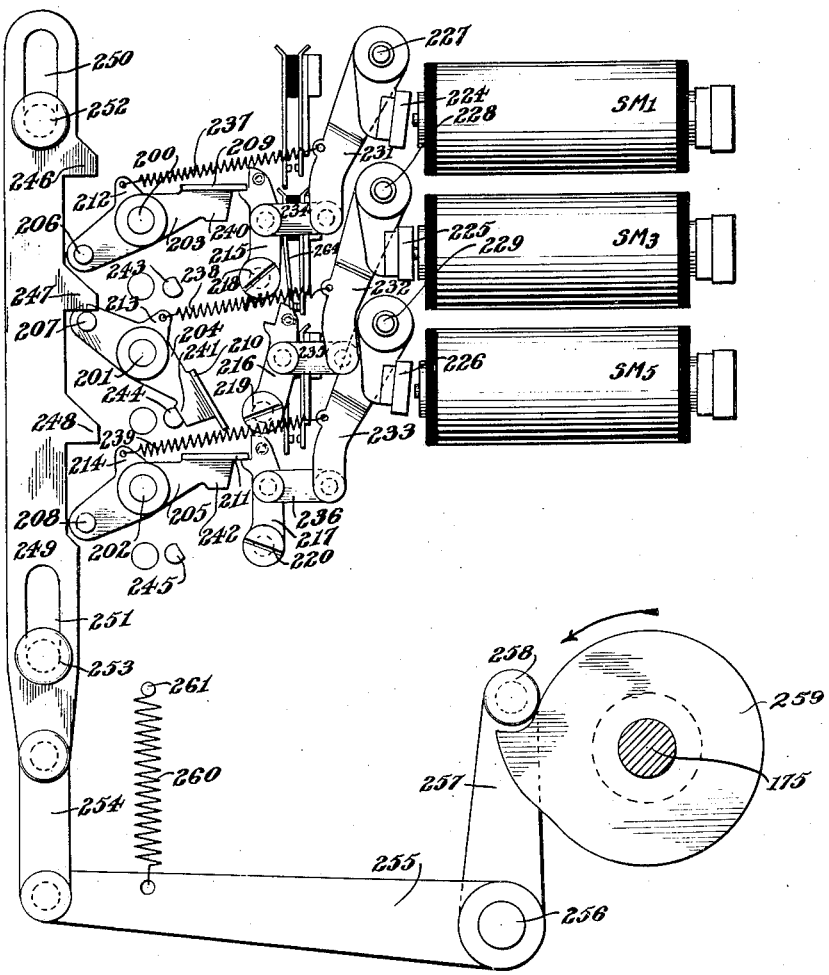
Figure 15 is an enlarged detail view of three of the code magnets illustrated in Figure 13, the cam for restoring the selecting bars being illustrated at the bottom of this figure.
Figure 16:
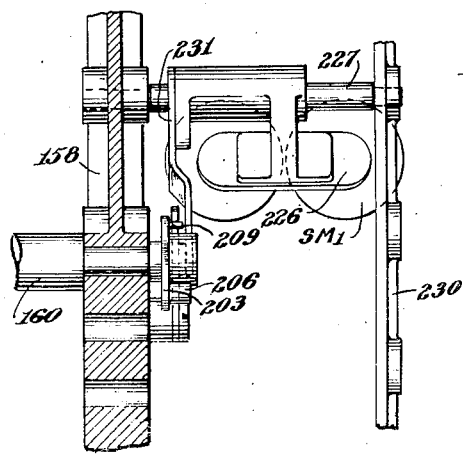
Figure 16 is a front elevation of one of the code magnets and its associated mechanism.

The invention is equipped with any suitable mechanism for actuating the selecting bars $S_1$, $S_2$, $S_3$, $S_4$, $S_5$, $S_6$ when the corresponding code perforations pass over the brushes. For accomplishing this object I prefer to employ the releasable mechanism which I have illustrated on the drawings and which I will now proceed to describe. The releasable mechanism for enabling the operation of bars $S_1$, $S_3$ and $S_5$ is located on the outside of and supported by the side member 158 as clearly illustrated in Figures 13 and 15. Upon the projecting ends 200, 201, and 202 of said bars are secured the arms 203, 204 and 205, the latter being provided with studs 206, 207 and 208, projections 209, 210 and 211, and spring anchoring extensions 212, 213 and 214. The projections are normally engaged and held by the latch members 215, 216 and 217 pivoted respectively about centers 218, 219 and 220. The latch members are released by energizing the magnets $SM$, $SM_3$ and $SM_5$ respectively, said magnets being provided with armatures 224, 225 and 226 respectively fixed upon the rotatable shafts 227, 228 and 229. Suitable bearings are provided for these shafts in the side plate 158 and the false plates or member 230 as clearly illustrated in Figure 16, only the shaft 227 however being fully illustrated. The armatures are in turn provided with arms 231, 232 and 233 respectively connected to said latch members by the respective links 234, 235 and 236. Or in lieu thereof the arms 231, 232 and 233 may be fixed upon the shafts 227, 228 and 229 respectively as illustrated by arm 231 in Figure 16. Connected to the arms 231, 232 and 233 with the respective extensions 212, 213 and 214 are springs 237, 238 and 239 which, upon the release of the latches, effect the rotation of the translating bars. The arms 203, 204 and 205 are provided respectively with heels 240, 241 and 242, which engage with stops 243, 244 and 245 when the said arms are released. These stops therefore arrest or limit the rotation of the said arms under the tension of the springs 237, 238 and 239. In Fig. 15 the magnet $SM_3$ is illustrated as being energized with the latch 216 released, the selecting bar $S_3$ rotated to operative position, and the heel 241 of arm 204 abutting against the stop 244. Located in the path of the studs 206, 207 and 208 are corresponding lugs 246, 247 and 248 projecting from the restoring plate 249, the normal position of which is illustrated in Figures 13 and 15 with the lower ends of the slots 250 and 251 engaging respectively the supporting studs 252 and 253. The lower end of the restoring plate 249 is pivotally connected to one end of a link 254, the other end of said link being pivotally connected to the arm 255 secured to a rock-shaft 256 journaled in the side frames 158 and 159 (see Figure 2). Intermediate its ends said rock-shaft is provided with an arm 257 having a stud 258 which rides upon the surface of the restoring cam 259. For holding said stud in engagement with the cam 259 and for maintaining the slide member 249 in its normal position, I employ a spring 260, one end of which is connected to the arm 255 and the other end of which is suitably anchored to a lug 261 on the side member 158. As will be clearly apparent from Figure 13, the studs 243, 244 and 245 are mounted upon a bar 262 suitably secured to the side frame 158, and the magnets $SM$, $SM_2$ and $SM_3$ are supported by the bar 263 also secured to the side frame 158.

In the foregoing paragraph I have described certain mechanism for actuating the selecting bars $S_1$, $S_3$ and $S_5$. Identically similar mechanism is located upon the outside of side frame 159 for actuating the bars $S_2$, $S_4$ and $S_6$. In other words, the various elements for actuating the bars $S_2$, $S_4$ and $S_6$ correspond to the parts designated above by the reference numerals 200 to 255 inclusive, and 260 to 263 both inclusive. The parts 256 to 259 both inclusive are common to both sets of mechanism. It will be readily apparent, however, that the mechanism for actuating the selecting bars may be variously constructed and arranged, the construction and arrangement which I have disclosed being preferable and for illustrative purposes only. It may be stated at this point that when magnet $SM_3$ is energized (see Fig. 15) the selecting bar $S_3$ is moved to operative position, as above described. At the same time that the armature 225 is attracted electrical connections are so established through the contact 264, as clearly illustrated in Figure 15, that the print clutch magnet 21PM is energized to move the print clutch 21P to operative position. This release of the one revolution clutch 21P causes the translating mechanism to be actuated and the desired letter to be printed.

From the foregoing it will be seen that by employing the selecting bars $S_1$, $S_2$, $S_3$, $S_4$, $S_5$ and $S_6$, I have devised a translation mechanism which enables the various type bars of the typewriter to be actuated and other operations to be performed by the use of a minimum number of parts. And also enabling the entire equipment to be made in a very compact form.

Figure 25:
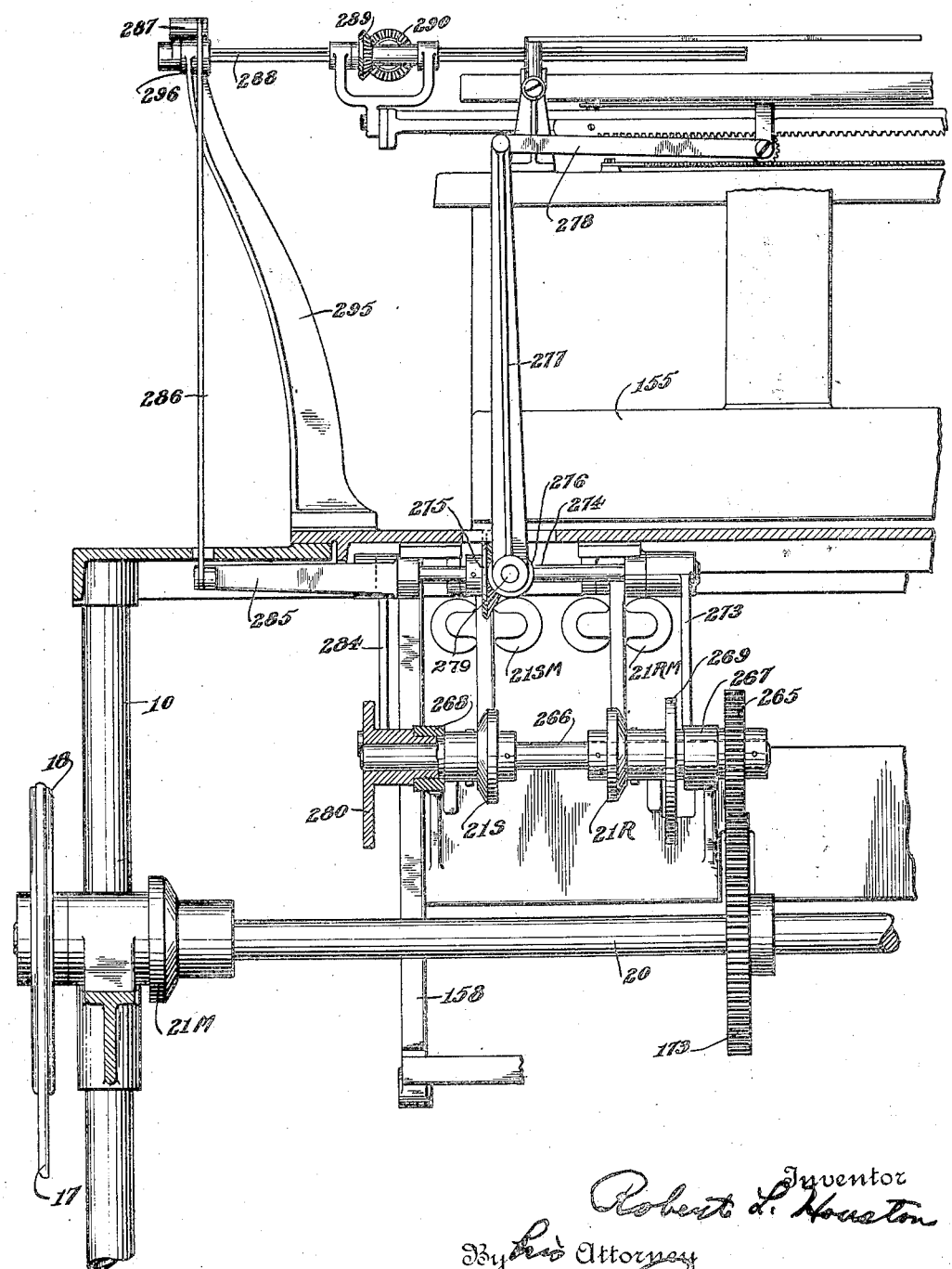
Figure 25 is an enlarged rear elevation showing the operating mechanism for spacing the paper and returning the carriage.

The gear 173 also meshes with a pinion 265 fixed upon a counter shaft 266 (see Figs. 23 and 25) mounted to rotate in suitable bearings 267 and 268. Loosely mounted upon this shaft is a cam 269 for actuating the carriage return mechanism. Adjacent the cam 269 is a one revolution clutch 21R which is so controlled by the magnet 21RM that the cam is coupled up to rotate with the shaft 266 when the proper code perforations pass under the brushes. The surface of the cam 269 thereby engages the stud 272 on arm 273 and thereby oscillates the same in one direction to impart a partial revolution to the shaft 274 upon which said arm 273 is fixed. Upon this shaft 274 is fixed a bevel gear 275 meshing with a bevel gear 276 about the axis of which is secured one end of an arm 277, the angular movement of which is by construction same as the angular movement of said bevel gear 276. The other end of this arm 277 is pivotally connected to one end of link 278, the other end of said link being pivotally connected to the carriage return mechanism. The gear 276 and arm 277 are fixed to a shaft 279 the axis of which is at right angles to the axis of the shaft 274.

Also upon the counter-shaft 266 is loosely mounted a cam 280 adjacent to which is a one revolution clutch 21S which is so controlled by the magnet 21SM that the cam is coupled up to rotate with the shaft 266 when the proper code perforation passes under the brushes to actuate the spacing mechanism. The latter comprises a stud 283 mounted upon arm 284 and engaging the surface of said cam. The arm 284 is integral with or suitably connected to the arm 285, the outer end of which is pivoted to one end of the link 286, the other end of said link being pivotally connected to the arm 287 fixed upon the spacer shaft 288. Upon the shaft 288 is suitably fixed a bevel gear 289 which meshes with a companion bevel gear 290 mounted upon the shaft 291. (See Fig. 24.) The latter is operatively connected to the usual pawl 292 which engages with the usual ratchet 293 for spacing purposes as will be readily understood by those skilled in the typewriter art. The shaft 291 is provided with an extension 294 to enable the spacing mechanism and the return of the carriage to be manually actuated whenever desired. To give more rigidity to the shaft 288 an arm 295 having a bearing 296 for said shaft is employed.

The carriage return cam 269 and the spacing cam 280 in the construction illustrated, are shown as being in the same relative position and as being of the same size. It will of course be understood that the carriage return and the spacing mechanism are independently controlled.

Located adjacent the lower end of the special plate 167, is a contact 332 (see Figures 20 and 21) which controls the clutch 21A for actuating the tape A feed mechanism. Similar contacts 330 and 331 (see wiring diagram Fig. 27) are provided adjacent the plates 168 and 169 for controlling the tape B and tape C clutches. Similar contacts 325 and 327 are located adjacent the plates 170 and 171 for controlling the carriage return clutch 21R and the spacer clutch 21S. And located adjacent the lower end of the special plate 172 is a contact 306 which breaks the circuit to stop the machine.

The operation of the complete machine will be readily understood by referring chiefly to the diagram of electric circuits illustrated on Figure 27. The line wires indicated by the numerals 300 and 301 receives the current upon the closing of the switch 302. Connecting the line wires 300 and 301 is a wire 303 leading to and from the motor 14. The closing of the motor switch 117 starts the motor which actuates the pulley 16, belt 17, pulley 18 and driving sleeve 19, as previously described. The operator then depresses the start key 118 which causes the current to flow from the line 300 through wire 304, emergency stop 305, six hole stop 306 and relay 307 to line 301. When the relay 307 is energized current flows from the line 300 through wire 308, armature of relay 307, wire 309, magnet coil 21M, emergency stop 305, six-hole stop 306, relay 307 to line wire 301. This causes the relay 307 to stick although the motor start key 118 is released. When the magnet coil 21M is energized the clutch 21 is thrown in, thus coupling up the sleeve 19 with the main drive shaft 20 (see Figs. 1 and 2) and causing the machine to operate. Inasmuch as the current continues to pass through the magnet coil 21M during the operation of the machine, the said magnet remains energized, thus maintaining the clutch 21 in operative position, as previously described in connection with Figure 11. In this connection it may be stated that the six-hole stop 306 serves to automatically stop the machine, whereas the same result can be accomplished manually by the emergency stop 305.

The paper having been supplied to the typewriter and the tapes A, B and C having been properly positioned, the operator closes the tape A start key 310 with a result that current flows from line 300 through wire 311, magnet coil 140, wire 313, clutch magnet coil 21AM, wire 314, tape A start key 310 and wire 315 back to line 301. When the coil 21AM is energized the armature 105 (see also Figure 9) is attracted, thus actuating the lever 100 to render the clutch 21A for actuating the tape A feed mechanism operative. The armature is held in such operative position by means of the latch 108 so that although the magnet is de-energized the clutch is held in operative position. The tape A now begins to pass under code brushes 74 of the tape A feeding mechanism.

Printing of a letter takes place in the following manner. For convenience reference is made to the printing of the numeral 3 which, on the code tape, whether tape A tape B or tape C, comprises a single perforation located in the third vertical row. Reference, however, is made to tape A. When this perforation passes under the third brush 74, as it will be by the tape A feeding mechanism, a circuit is established through the wire 316, armature 317, wire 318, brush 74, wire 319, magnet coil $SM_3$ and wire 320, to line 301. When the magnet coil $SM_3$ is energized the selecting bar $S_3$ is moved to operative position. At the same time that the armature 235 is raised the contact 264 is made to energize the print clutch magnet 21PM as follows. The current flows from line 300, wire 321, common wire 322, armature 225, contact 264, common wire 323, wire 324 and print clutch magnet coil 21PM to line 301. This renders the one revolution clutch 21P effective to actuate the translating and printing mechanism and thus to print the numeral 3.

Each horizontal row of perforations in the tape represents some letter, numeral or character to be printed or typed on the typewriter, or some operation of the machine to be automatically performed. If the horizontal row comprises only one perforation then only the particular selecting bar corresponding to the vertical row of perforations in which that perforation is located will be actuated, thus causing an alignment of the notches in the selecting bars corresponding to the particular translating plate to enable the latter to drop into said notches, thus bringing it to operative position to be actuated by the printing mechanism. Such alignment of the notches is clearly indicated in Figure 19. On the other hand, if the horizontal row comprises more than one perforation, then a plurality of the selecting bars will be actuated to bring the notches therein corresponding to the particular translating plate into alignment, as will be understood.

In the embodiment of my invention illustrated and described the arrangement is such that each tape feeding device is provided with six code brushes and two control brushes which bear on the tape in such a position as to pass over its own vertical row in the code tape. Reference to Figure 26 will show the various code perforations in the respective tapes, together with notations adjacent the margins thereof to indicate the meaning of the perforations in each horizontal row. The translating device consists essentially of six notched selecting bars which are magnetically controlled and which cooperate with a bank of character translating plates. These plates, upon the operation of the selecting bars, are forced against said bars, and select the particular character, the first six columns of code perforations of each tape controlling the position of said bars, as previously described. It may be stated at this point that each of the six bars is provided with a corresponding code brush on each feed mechanism. It is true that there are eight brushes shown on each feed mechanism, but those corresponding to the numerals 334 and 339 are for a different purpose, as will more fully appear below. The number of brushes corresponds, however, to the number of vertical rows in the code tapes.

Besides the bank of character, figure, word, space and tabulating selecting plates, the translating device, as before stated, has six special plates 167, 168, 169, 170, 171 and 172 which serve to actuate respectively a corresponding number of contacts which contacts respectively control mechanism (1) for returning the carriage, (2) for spacing the paper vertically (3) for automatically stopping the machine, (4) for changing from tape A to tape B or C (5) for changing from tape B to tape C or A, and (6) for changing from tape C to tapes A and B. Upon the passage of the proper horizontal row of code perforations in the tape, the selecting bars are so actuated as to bring the notches corresponding to the special carriage return plate into alignment to enable said plate to enter said notches. This closes the contact 325, thus enabling the current to pass from line 300 through wire 326 and magnet 21RM to line 301. This energizes the magnet 21RM, throws in the clutch 21R and returns the carriage, as fully described in connection with Figure 25. Upon the passage through the feed mechanism of the proper horizontal row of code perforations in the tape, the selecting bars are so controlled as to bring another series of notches into vertical alignment corresponding to the special paper space plate so as to enable said plate to enter said series of notches. This closes the contact 327, thus enabling the current to flow from line 300 through wire 328 and magnet 21SM to line 301. This energizes the magnet 21SM, thereby throwing in the clutch 21S and spacing the paper as clearly described in connection with Figure 25. Similarly another vertical row of notches in the translating bars are brought into vertical alignment corresponding to the special plate for opening the contact 306 to break the circuit through relay 307 causing the armature thereof to drop and de-energizing the magnet 21M with the result of stopping the entire mechanism.

If tape A is being fed through the machine and it is desired to change to tape B, B-clutch perforations are inserted into tape A. The selecting bars are so controlled thereby as to present another series of notches into vertical alignment corresponding to the special B-clutch plate so as to enable said plate to enter said series of notches. This will close the contact 330 causing the clutch magnet 21BM to be energized and the feed mechanism for the tape B to be started. At the same time the magnet 144 will be energized and latches 108 and 108C (see also Figures 4 and 5) will be released. The armature 105C is already down, but armature 105 will drop slowly due to the dash pot 110 and its associated mechanism as described in connection with Figure 9, thus enabling the tape A to continue its advance until its brushes rest on a portion thereof having no perforations. If tape B is being fed through the machine and it is desired to change to tape C, C-clutch perforations are inserted into the tape B. Similarly the selecting bars are so controlled thereby as to present another series of notches into vertical alignment corresponding to the special C-clutch selecting plate so as to enable said plate to enter said series of notches. This will close the contact 331 causing the clutch magnet 21CM to be energized and the feed mechanism for the tape C to be started. At the same time the magnet 151 will be energized and the latches 108 and 108B (see also Figures 4 and 5) will be released. The armature 105 is already down, but armature 105B will drop slowly due to the retarding influence of the dash pot 110B and its associated mechanism as described in connection with Figure 9, thus enabling the tape B to continue its advance until its brushes rest on a portion thereof having no perforations. If tape C is being fed through the machine and it is desired to change to tape A, an A-clutch code is inserted into the tape C. Similarly the selecting bars are so controlled thereby as to present another series of notches into vertical alignment corresponding to the special C-clutch plate so as to enable said plate to enter said series of notches. This will close the contact 332 causing the clutch magnet 21AM to be energized and the feed mechanism for the tape A to be started. At the same time the magnet 140 will be energized and the latches 108B and 108C (see also Figures 4 and 5) will be released. The armature 105B is already down, but armature 105C will drop slowly due to the retarding action of the dash pot 110C and its associated mechanism as described in connection with Figure 9, thus enabling the tape C to continue its advance until its brushes rest on a portion thereof having no perforations. And from the foregoing it will be readily apparent in short that by providing the appropriate perforations in the code tapes a change may be made from any particular tape being fed through the machine to any other tape. In other words, it will be seen that I have provided means for feeding a plurality of separate columns of code indications coupled up with mechanism for selecting and translating material from any one of these columns. Such mechanism is automatically controlled by the machine for predetermining the sequence or order in which the material represented on such a column or columns is translated on the typewriter. Furthermore, it will be seen that means are provided and controlled by one of said tapes for interpolating material to be translated from another tape.

Provisions are made for cutting out addresses or other matter on any one of the tape feeding devices. To accomplish this, there is provided to the right of the six vertical columns of code perforations two additional vertical columns X and Y. If the X perforation passes under the brushes it will cause the current to flow from line 300 through the common wire 333, brush 334, wire 335, relay 336 and wire 337 to line 301. This raises the armature 317 which is held in such raised position by means of the armature latch 338. At the same time the brush circuit through the wire 318 is broken. This will enable the particular tape to continue its movement without translating the material thereon. The translation, however, may be resumed at any point by providing a Y perforation in the tape. When the Y perforation passes under the brushes it will cause the current to flow from line 300 through wire 333, brush 339, wire 340, relay 341 and wire 337 to line 301. The relay 341 attracts the armature latch 338, thus releasing the armature 317 and restoring the circuit through wires 316 and 318 and causing the brushes for the first six vertical columns of the tape to become active. Thus it will be apparent that I have provided mechanism controlled by the tape for skipping or selecting material thereon, such as the omission or addition of addresses or the elimination and addition of sentences and paragraphs from and to the body of the letter.

From the foregoing it will be seen that I have devised a simple machine which will enable the automatic printing of letters, including the date, address, salutation, personal matter, tabulations etc. It is to be expressly understood, however, that the construction illustrated and described herein is merely the preferred embodiment of my invention and that I do not limit myself thereto as many changes may be made and other embodiments resorted to without deviating from the true spirit and scope of my invention.

What I claim is:

1. An automatic typewriter comprising means for feeding three perforated code tapes, type levers, and means controlled by said tapes for operating the type levers in accordance with the codes on said tapes, in combination with means for automatically selecting from any one of said code tapes, said means comprising means for simultaneously rendering inoperative either of the other code tapes previously in operation.

2. A device of the class described comprising a typewriter, means for advancing three perforated code tapes, and an electro-magnetically operated device controlled by said tapes for operating the typewriter in accordance with the codes on said tapes, in combination with means controlled by said tapes for automatically selecting from any one of them, said means comprising means for simultaneously rendering inoperative either of the other code tapes previously in operation.

3. An automatic typewriter comprising means for feeding three perforated code tapes, in combination with means for automatically translating the material on any one of said tapes into typewriting, and means controlled by said tapes for interpolating the material thereon in any order.

4. An automatic typewriter comprising means for feeding three perforated code tapes, in combination with means for automatically selecting and translating material from any one of said tapes.

5. An automatic typewriter comprising means for feeding three separate columns of code indications, in combination with automatic means for selecting and translating material from any one of said columns.

6. An automatic typewriter comprising means for feeding three perforated code tapes, in combination with means controlled by the machine for automatically predetermining the sequence or order in which the material on said tapes is translated on the typewriter.

7. An automatic typewriter comprising means for feeding three separate columns of code indications, in combination with means automatically controlled by the machine for predetermining the sequence or order in which the material represented on such columns is translated on the typewriter.

8. An automatic typewriter comprising three perforated code tapes, means for moving one of said tapes while the others are at rest, and means automatically controlled by the movable tape for stopping its own movement and for effecting the movement of any of the other tapes.

9. An automatic typewriter comprising three perforated code tapes, means for automatically translating the material on said tapes into typewriting, in combination with means for automatically predetermining the sequence or order in which the material on the different tapes is translated.

10. An automatic typewriter comprising three perforated code tapes, means for automatically translating the material on said tapes into typewriting, in combination with means controlled by one of said tapes for selecting material to be translated from any of the other tapes.

11. An automatic typewriter comprising three perforated code tapes, means for automatically translating the material on one of said tapes into typewriting, in combination with means controlled by said tape for interpolating material to be translated from the other tape or tapes.

12. An automatic typewriter comprising three perforated code tapes, means for automatically translating the material on said tapes into typewriting, in combination with means controlled by said tapes for interpolating the material thereon in any order into typewriting.

13. An automatic typewriter comprising a plurality of perforated code tapes, means for moving one of said tapes while the other is at rest, electrically operated releasing means automatically controlled by the movable tape for stopping its own movement and for effecting the movement of the other tape, and means for enabling a slight advance of said movable tape after said releasing mechanism has been actuated.

14. In an automatic typewriter, a plurality of movable perforated code tapes and individual mechanism for feeding each of said tapes, in combination with means for translating the material on said tapes into typewriting comprising a plurality of selecting bars controlled by each of said tapes for selecting the printing device to be actuated, and means also controlled by said tapes and said bars for automatically shifting from one tape to another.

15. In an automatic typewriter, a plurality of movable perforated code tapes, means for moving one of said tapes while the others are at rest, and means for translating the material on said tapes into typewriting, in combination with means controlled by the movable tape for selecting material from one of the other tapes comprising a plurality of selecting bars and means cooperating therewith for stopping the movement of the moving tape and starting the movement of another tape.

16. An automatic typewriter comprising means for feeding a record, contacts on opposite sides of the record, an electromagnet in circuit, a one-revolution clutch rendered operative by the electromagnet armature, and means actuated by the clutch for returning a typewriter carriage.

17. In an automatic typewriter, mechanism for feeding a record, contacts on opposite sides of the record, and an electromagnet in circuit, in combination with mechanism for returning a typewriter carriage, and a one-revolution clutch rendered operative by the armature of said electromagnet for actuating said carriage returning mechanism.

18. In an automatic typewriter, a power shaft, mechanism actuated by said shaft for feeding a record, contacts on opposite sides of the record, and an electromagnet in circuit, in combination with mechanism also actuated by said power shaft for returning a typewriter carriage comprising a one-revolution clutch controlled by the armature of said electromagnet.

19. In an automatic typewriter, a power shaft, mechanism actuated by said shaft for feeding a record, contacts on opposite sides of said record, and an electromagnet in circuit, in combination with normally inoperative means also actuated by said power shaft for returning a typewriter carriage, and a one-revolution clutch controlled by the electromagnet for rendering said means operative.

20. An automatic typewriter comprising means for feeding a record, contacts on opposite sides of the record, an electromagnet in circuit, a clutch, means actuated by said electromagnet for setting said clutch, said means being automatically released by a predetermined movement of the clutch, and means actuated by said movement of the clutch for returning a typewriter carriage.

21. An automatic typewriter comprising means for feeding a record, an electromagnet, a clutch, means controlled by said record for closing a circuit through said electromagnet to set said clutch, said circuit being broken by said record immediately after said clutch has been set, means for automatically releasing said clutch after a predetermined movement of the same, and means actuated by the movement of the clutch for returning a typewriter carriage.

22. An automatic typewriter comprising three perforated code tapes, and means for automatically translating the material on said tapes into typewriting, in combination with means for automatically controlling the sequence or order in which the material on said tapes is translated.

23. An automatic typewriter comprising three perforated code tapes, and means for automatically translating the material on said tapes into typewriting, in combination with means controlled by said tapes for determining the sequence or order in which the material on said tapes is translated.

24. An automatic typewriter as defined by claim 22, in combination with means for skipping or omitting a portion of the material recorded on any one of said tapes.

25. An automatic typewriter as defined by claim 22, in combination with electromagnetically operated means for skipping or omitting a portion of the material recorded on any one of said tapes.

26. An automatic typewriter as defined by claim 23, in combination with means for skipping or omitting a portion of the material recorded on any one of said tapes.

27. An automatic typewriter as defined by claim 23, in combination with electromagnetically operated means for skipping or omitting a portion of the material recorded on any one of said tapes.

28. An automatic typewriter comprising three perforated code tapes, power means for feeding said tapes, and electromagnetically operated means for automatically translating the material on said tapes into typewriting, in combination with electromagnetically operated means controlled by said tapes for determining the sequence or order in which the tapes are fed.

29. An automatic typewriter as defined by claim 23, in combination with means for skipping or omitting a portion of the material recorded on any one of said tapes.

30. An automatic typewriter as defined by claim 28, in combination with electromagnetically operated means for skipping or omitting a portion of the material recorded on any one of said tapes.

31. An automatic typewriter comprising three perforated code tapes, power means for feeding said tapes, and electromagnetically operated means for automatically translating the material on said tapes into typewriting, in combination with electromagnetically operated means controlled by the tapes for determining the sequence or order in which the tapes are fed, and electromagnetically operated means controlled by the record on any one tape for discontinuing its own movement and for selecting upon either of the other tapes.

32. An automatic typewriter comprising three perforated code tapes, power means for feeding said tapes, and electromagnetically operated means controlled by said tapes for rendering the feeding means of one of said tapes operative and simultaneously rendering the feeding means of the other tapes inoperative.

33. An automatic typewriter, comprising three perforated code tapes, and power means for feeding said tapes, in combination with electromagnetically controlled means for feeding only one tape at a time, and electromagnetic means controlled by the tape being fed for discontinuing its own movement and simultaneously starting the movement of one of the other tapes.

34. An automatic typewriter comprising three perforated code tapes, and means for automatically translating the material on said tapes into typewriting, in combination with means for automatically controlling the sequence or order in which the material on said tapes is translated, and means controllable by any one of said code tapes for returning the typewriter carriage.

35. An automatic typewriter comprising three perforated code tapes, and means for automatically translating the material on said tapes into typewriting, in combination with means controlled by said tapes for determining the sequence or order in which the material on said tapes is translated, and means controllable by any one of said tapes for returning the typewriter carriage.

36. An automatic typewriter comprising three perforated code tapes, power means for feeding said tapes, and electromagnetically operated means for automatically translating the material on said tapes into typewriting, in combination with electromagnetically operated means controlled by said tapes for determining the sequence or order in which the tapes are fed, and electromagnetic means controllable by any one of said tapes for returning the typewriter carriage.

37. An automatic typewriter comprising three perforated code tapes, power means for feeding said tapes, and electromagnetically operated means for automatically translating the material on said tapes into typewriting, in combination with electromagnetically operated means controlled by the tapes for determining the sequence or order in which the tapes are fed, electromagnetically operated means controlled by the record on any one tape for discontinuing its own movement and for selecting upon either of the other tapes, and electromagnetic means controllable by any one of said tapes for returning the typewriter carriage.

38. An automatic typewriter comprising three perforated code tapes, power means for feeding said tapes, electromagnetically operated means controlled by said tapes for rendering the feeding means of one of said tapes operative and simultaneously rendering the feeding means of the other tapes inoperative, and electromagnetic means controllable by any one of said tapes for returning the typewriter carriage.

39. An automatic typewriter, comprising three perforated code tapes, and power means for feeding said tapes, in combination with electromagnetically controlled means for feeding only one tape at a time, electromagnetic means controlled by the tape being fed for discontinuing its own movement and simultaneously starting the movement of one of the other tapes, and means controllable by any one of said tapes for returning the typewriter carriage.

40. The combination with a typewriter, of actuating means for said typewriter, a plurality of movable tapes, each of which is adapted to control the said actuating means, unidirectional feeding means for always feeding each of said tapes in a single direction, one of said tapes being formed to effect the body portion of the typewritten work, a second tape being formed to effect interpolations or inserts, and a third tape being formed to effect the name and addresses, and means for controlling said feeding means to change from control by one tape to control by any other tape.

41. In an automatic typewriter, a movable perforated code tape, mechanism for feeding said tape, electric contacts on opposite sides of said tape adapted to be closed through the perforations therein, and a plurality of electromagnets in circuit, in combination with means for translating the material on said tape into typewriting comprising a plurality of printing devices, a plurality of selectors actuated by said electromagnets when the circuit is closed through the perforations in said tape for selecting the printing devices to be actuated, common actuating means for all of said printing devices for actuating said printing devices as they are selected, and electromagnetic means rendered operative by the aforesaid electromagnets for controlling the operation of said common actuating means.

42. In an automatic typewriter, a plurality of movable perforated code tapes, individual mechanism for feeding each of said tapes, electric contacts on the opposite sides of said tapes adapted to be closed by the perforations therein, a plurality of electromagnets in circuit, and electromagnetic means controlled by said tape whereby only one tape is fed at a time, in combination with means for translating the material on said tapes into typewriting comprising a plurality of printing devices, a plurality of selectors actuated by said electromagnets when the circuit is closed through the perforations in the tape being fed for selecting the printing devices to be actuated, common actuating means for all of said printing devices for actuating said printing devices as they are selected, electromagnetic means rendered operative by the aforesaid electromagnets for controlling the operation of said common actuating means, and electromagnetic means controlled by the tape being fed and by said selectors for stopping the movement of the tape being fed and for shifting to and starting the operation of another tape.

43. An automatic typewriter comprising means for feeding a record, contacts on opposite sides of the record, electromagnets in circuit, clutches operated by the electromagnet armatures, mechanism actuated by one of said clutches for returning a carriage, mechanism actuated by another clutch for spacing the paper vertically, mechanism actuated by another clutch for operating the typewriter keys, means common to all of said mechanism and rendered operative by the movement of said record for selecting and controlling the operation of said clutches, and means for skipping or omitting a portion of the material recorded on said record.

44. An automatic typewriter, comprising means for feeding a record, contacts on opposite sides of the record, an electromagnet, clutch operated by the electromagnet armature, means rendered operative by the clutch for actuating the character and shift keys of a typewriter, means common to all of said keys and rendered operative by the record for selecting and controlling the operation of any one of said keys, and means for skipping or omitting a portion of the material recorded on said record.

45. An automatic typewriter, comprising means for feeding a record, contacts on opposite sides of the record and an electromagnet in combination with mechanism for operating the character and shift keys of the typewriter, comprising a clutch operated by the armature of said electromagnet for rendering said mechanism operative, electromagnetically operated means common to all of said keys and rendered operative by said record for selecting and controlling the operation of any one of said keys, and means for skipping or omitting a portion of the material recorded on said record.

46. In an automatic typewriter, a power means, mechanism actuated by said power means for feeding a record, contacts on opposite sides of the record, and an electromagnet, in combination with mechanism also actuated by said power means for operating the character and shift keys of the typewriter, comprising a clutch operated by the armature of said electromagnet for rendering said mechanism operative, electromagnetically operated means common to all of said keys and rendered operative by said record for selecting and controlling the operation of any one of said keys, and means for skipping a portion of the material recorded on said record.

47. In an automatic typewriter, a power means, mechanism actuated by said means for feeding a record, contacts on opposite sides of said record, and an electromagnet, in combination with normally inoperative mechanism also actuated by said power means for operating the character and shift keys of the typewriter, a clutch actuated by the armature of said electromagnet for rendering said normally inoperative mechanism operative, electromagnetically operated means common to all of said keys and rendered operative by said record for selecting and controlling the operation of any one of said keys, and means for skipping or omitting a portion of the material on said record.

48. In an automatic typewriter, a power shaft, mechanism actuated by the power shaft for feeding a record, contacts on opposite sides of said record, and an electromagnet, in combination with normally inoperative mechanism also actuated by said power shaft for operating the character and shift keys of the typewriter, a clutch actuated by the said electromagnet for rendering said normally inoperative means operative, electromagnetically operated means common to all of said keys and rendered operative by said record for selecting and controlling the operation of any one of said keys, and means for skipping or omitting a portion of the material recorded on said record.

49. In an automatic typewriter, power means, and mechanism actuated by said power means for feeding a record, in combination with means controlled by said record for operating the character and shift keys of a typewriter, comprising the character and shift keys of a typewriter, comprising normally inoperative actuating means, electromagnetic means for rendering said actuating means operative, electromagnetically operated means common to all of said keys and rendered operative by said record for selecting and controlling the operation of any one of said keys, and means for skipping or omitting a portion of the material recorded on said record.

50. In an automatic typewriter, power means, and mechanism actuated by said power means for feeding a record, in combination with means controlled by said record for operating the character and shift keys of a typewriter, comprising electromagnetically operative means common to all of said keys and rendered operative by said record for selecting and controlling the operation of any one of said keys, normally inoperative actuating means for said keys, electromagnetic means controlled by the aforesaid electromagnetically operated means for rendering said normally inoperative actuating means operative, and means for skipping or omitting a portion of the material recorded on said record.

51. In an automatic typewriter, power means, mechanism actuated by said power means for feeding a record, in combination with means controlled by said record for operating the character and shift keys of a typewriter, comprising contacts on opposite sides of said record, a plurality of electromagnets in circuit, means common to all of said keys and actuated by said electromagnets for selecting and controlling the operation of any one of said keys, normally inoperative means actuated by said power means for operating said keys, and electromagnetic means controlled by said electromagnets for rendering said normally inoperative means operative, and means for skipping or omitting a portion of the material recorded on said record.

52. An automatic typewriter, comprising means for feeding a record, electromagnetically controlled means for actuating the character and shift keys of the typewriter, electromagnetically controlled selecting means common to all of said keys and rendered operative by the record for selecting and controlling the operation of any one of said keys, and means for skipping or omitting a portion of the material recorded on said record.

53. An automatic typewriter, comprising means for feeding a record, electromagnetically controlled selecting means common to the character and shift keys of the typewriter and rendered operative by the record for selecting and controlling the operation of any one of said keys, an electromagnetically controlled power driven member for actuating any key selected for operation, and means for skipping or omitting a portion of the material recorded on said record.

In testimony whereof, I have hereunto set my hand this 7th day of April, 1922.

ROBERT L. HOUSTON.